US009553453B2

(12) United States Patent
Tyler et al.

(10) Patent No.: US 9,553,453 B2
(45) **Date of Patent: *Jan. 24, 2017**

(54) MANAGEMENT OF ENERGY DEMAND AND ENERGY EFFICIENCY SAVINGS FROM VOLTAGE OPTIMIZATION ON ELECTRIC POWER SYSTEMS USING AMI-BASED DATA ANALYSIS

(71) Applicant: Dominion Resources, Inc., Richmond, VA (US)

(72) Inventors: Stephen J. Tyler, Henrico County, VA (US); Phillip W. Powell, Chesterfield County, VA (US)

(73) Assignee: Dominion Resources, Inc., Richmond, VA (US)

( * ) Notice: Subject to any disclaimer, the term of this patent is extended or adjusted under 35 U.S.C. 154(b) by 70 days.

This patent is subject to a terminal disclaimer.

(21) Appl. No.: 14/193,770

(22) Filed: Feb. 28, 2014

(65) Prior Publication Data

US 2014/0265574 A1 Sep. 18, 2014

Related U.S. Application Data

(60) Provisional application No. 61/800,028, filed on Mar. 15, 2013.

(51) Int. Cl.
*H02J 3/00* (2006.01)
*H02J 3/32* (2006.01)

(52) U.S. Cl.
CPC ............ *H02J 3/32* (2013.01); *H02J 2003/007* (2013.01); *Y02E 40/76* (2013.01); *Y02E 60/76* (2013.01);

(Continued)

(58) Field of Classification Search
CPC .... H02J 3/32; H02J 2003/007; Y10T 307/406
(Continued)

(56) References Cited

U.S. PATENT DOCUMENTS

| | | |
|---|---|---|
| 3,900,842 A | 8/1975 | Calabro et al. |
| 3,970,898 A | 7/1976 | Baumann et al. |

(Continued)

FOREIGN PATENT DOCUMENTS

| | | |
|---|---|---|
| EA | 9685 | 2/2008 |
| EP | 0020310 A1 | 12/1980 |

(Continued)

OTHER PUBLICATIONS

Fletcher, Robert H. et al., "Integrating Engineering and Economic Analysis for Conservation Voltage Reduction," Power Engineering Society Summer Meeting, 2002 IEEE (vol. 2), pp. 725-730.

(Continued)

*Primary Examiner* — Robert Fennema
*Assistant Examiner* — Sivalingam Sivanesan
(74) *Attorney, Agent, or Firm* — Blank Rome LLP

(57) ABSTRACT

A method, apparatus, system and computer program is provided for controlling an electric power system, including implementation of a voltage control and conservation (VCC) system used to optimally control the independent voltage and capacitor banks using a linear optimization methodology to minimize the losses in the EEDCS and the EUS. An energy validation process system (EVP) is provided which is used to document the savings of the VCC and an EPP is used to optimize improvements to the EEDCS for continuously improving the energy losses in the EEDS. The EVP system measures the improvement in the EEDS a result of operating the VCC system in the "ON" state determining the level of energy conservation achieved by the VCC system.

33 Claims, 13 Drawing Sheets

(52) U.S. Cl.
CPC .............. *Y04S 10/545* (2013.01); *Y04S 40/22* (2013.01); *Y10T 307/406* (2015.04)

(58) Field of Classification Search
USPC .......................................... 700/286; 307/31
See application file for complete search history.

(56) References Cited

U.S. PATENT DOCUMENTS 4,054,830 A 10/1977 Harrel
4,234,904 A 11/1980 Fahlesson
4,291,377 A 9/1981 Schneider et al.
4,302,750 A 11/1981 Wadhwani et al.
4,307,380 A 12/1981 Gander
4,309,655 A 1/1982 Lienhard et al.
4,310,829 A 1/1982 Rey
4,356,553 A 10/1982 Steinle et al.
4,361,872 A 11/1982 Spalti
4,365,302 A 12/1982 Elms
4,434,400 A 2/1984 Halder
4,513,273 A 4/1985 Friedl
4,525,668 A 6/1985 Lienhard et al.
4,540,931 A 9/1985 Hahn
4,630,220 A 12/1986 Peckinpaugh
4,686,630 A 8/1987 Marsland et al.
4,689,752 A 8/1987 Fernandes et al.
4,695,737 A 9/1987 Rabon et al.
4,791,520 A 12/1988 Stegmuller
4,843,310 A 6/1989 Friedl
4,853,620 A 8/1989 Halder et al.
4,881,027 A 11/1989 Joder et al.
4,887,028 A 12/1989 Voisine et al.
4,894,610 A 1/1990 Friedl
4,896,106 A 1/1990 Voisine et al.
5,028,862 A 7/1991 Roth
5,032,785 A 7/1991 Mathis et al.
5,055,766 A 10/1991 McDermott et al.
5,066,906 A 11/1991 Moore
5,124,624 A 6/1992 De Vries et al.
5,128,855 A 7/1992 Hilber et al.
5,136,233 A 8/1992 Klinkenberg et al.
5,231,347 A 7/1993 Voisine et al.
5,249,150 A 9/1993 Gruber et al.
5,262,715 A 11/1993 King et al.
5,270,639 A 12/1993 Moore
5,272,462 A 12/1993 Teyssandier et al.
5,298,857 A 3/1994 Voisine et al.
5,343,143 A 8/1994 Voisine et al.
5,422,561 A 6/1995 Williams et al.
5,432,507 A 7/1995 Mussino et al.
5,466,973 A 11/1995 Griffoen
5,475,867 A 12/1995 Blum
5,511,108 A 4/1996 Severt et al.
5,552,696 A * 9/1996 Trainor et al. ................ 323/275
5,602,750 A 2/1997 Severt et al.
5,604,414 A 2/1997 Milligan et al.
5,610,394 A 3/1997 Lee et al.
5,627,759 A 5/1997 Bearden et al.
5,646,512 A 7/1997 Beckwith
5,673,252 A 9/1997 Johnson et al.
5,736,848 A 4/1998 De Vries et al.
5,903,548 A 5/1999 Delamater
5,918,380 A 7/1999 Schleich et al.
5,963,146 A 10/1999 Johnson et al.
6,006,212 A 12/1999 Schleich et al.
6,026,355 A 2/2000 Rahman et al.
6,172,616 B1 1/2001 Johnson et al.
6,218,995 B1 4/2001 Higgins et al.
6,219,655 B1 4/2001 Schleich et al.
6,333,975 B1 12/2001 Brunn et al.
6,373,236 B1 4/2002 Lemay, Jr. et al.
6,373,399 B1 4/2002 Johnson et al.
6,417,729 B1 7/2002 Lemay et al.
6,555,997 B1 4/2003 De Vries et al.
6,590,376 B1 7/2003 Bammert et al.
6,618,684 B1 9/2003 Beroset et al.
6,628,207 B1 9/2003 Hemminger et al.
6,633,823 B2 10/2003 Bartone et al.
6,636,893 B1 10/2003 Fong
6,650,249 B2 11/2003 Meyer et al.
6,653,945 B2 11/2003 Johnson et al.
6,667,692 B2 12/2003 Griffin
6,684,245 B1 1/2004 Shuey et al.
6,700,902 B1 3/2004 Meyer
6,703,823 B1 3/2004 Hemminger et al.
6,738,693 B2 5/2004 Anderson
6,747,446 B1 6/2004 Voisine
6,747,981 B2 6/2004 Ardalan et al.
6,756,914 B1 6/2004 Fitzgerald et al.
6,757,628 B1 6/2004 Anderson et al.
6,762,598 B1 7/2004 Hemminger et al.
6,773,652 B2 8/2004 Loy et al.
6,778,099 B1 8/2004 Meyer et al.
6,798,353 B2 9/2004 Seal et al.
6,815,942 B2 11/2004 Randall et al.
6,816,538 B2 11/2004 Shuey et al.
6,832,135 B2 12/2004 Ying
6,832,169 B2 12/2004 Wakida et al.
6,838,867 B2 1/2005 Loy
6,847,201 B2 1/2005 De Vries et al.
6,859,186 B2 2/2005 Lizalek et al.
6,859,742 B2 2/2005 Randall et al.
6,867,707 B1 3/2005 Kelley et al.
6,868,293 B1 3/2005 Schurr et al.
6,873,144 B2 3/2005 Slater et al.
6,882,137 B1 4/2005 Voisine
6,885,185 B1 4/2005 Makinson et al.
6,888,876 B1 5/2005 Mason et al.
6,892,144 B2 5/2005 Slater et al.
6,900,737 B1 5/2005 Ardalan et al.
6,906,507 B2 6/2005 Briese et al.
6,906,637 B2 6/2005 Martin
6,940,268 B2 9/2005 Hemminger et al.
6,940,711 B2 9/2005 Heuell et al.
6,947,854 B2 9/2005 Swarztrauber et al.
6,954,061 B2 10/2005 Hemminger et al.
6,982,390 B2 1/2006 Heuell et al.
6,988,043 B1 1/2006 Randall
6,989,667 B2 1/2006 Loy
6,995,685 B2 2/2006 Randall
7,005,844 B2 2/2006 De Vries et al.
7,009,379 B2 3/2006 Ramirez
7,020,178 B2 3/2006 Mason et al.
7,043,381 B2 5/2006 Wakida et al.
7,046,682 B2 5/2006 Carpenter et al.
7,064,679 B2 6/2006 Ehrke et al.
7,069,117 B2 6/2006 Wilson et al.
7,075,288 B2 7/2006 Martin et al.
7,079,962 B2 7/2006 Cornwall et al.
7,084,783 B1 8/2006 Melvin et al.
7,089,125 B2 8/2006 Sonderegger
7,091,878 B2 8/2006 Holle et al.
7,109,882 B2 9/2006 Angelis
7,112,949 B2 9/2006 Voisine
7,116,243 B2 10/2006 Schleich et al.
7,119,698 B2 10/2006 Schleich et al.
7,119,713 B2 10/2006 Shuey et al.
7,126,493 B2 10/2006 Junker
7,126,494 B2 10/2006 Ardalan et al.
7,135,850 B2 11/2006 Ramirez
7,142,106 B2 11/2006 Scoggins
7,145,474 B2 12/2006 Shuey et al.
7,149,605 B2 12/2006 Chassin et al.
7,154,938 B2 12/2006 Cumeralto et al.
7,161,455 B2 1/2007 Tate et al.
7,167,804 B2 1/2007 Fridholm et al.
7,168,972 B1 1/2007 Autry et al.
7,170,425 B2 1/2007 Christopher et al.
7,176,807 B2 2/2007 Scoggins et al.
7,180,282 B2 2/2007 Schleifer
7,187,906 B2 3/2007 Mason et al.
7,196,673 B2 3/2007 Savage et al.
7,209,049 B2 4/2007 Dusenberry et al.
7,218,998 B1 5/2007 Neale
7,224,158 B2 5/2007 Petr

(56) References Cited

U.S. PATENT DOCUMENTS 7,227,350 B2 6/2007 Shuey
7,230,972 B2 6/2007 Cornwall et al.
7,236,498 B1 6/2007 Moos et al.
7,236,908 B2 6/2007 Timko et al.
7,239,125 B2 7/2007 Hemminger et al.
7,239,250 B2 7/2007 Brian et al.
7,245,511 B2 7/2007 Lancaster et al.
7,262,709 B2 8/2007 Borleske et al.
7,274,187 B2 9/2007 Loy
7,277,027 B2 10/2007 Ehrke et al.
7,283,062 B2 10/2007 Hoiness et al.
7,283,580 B2 10/2007 Cumeralto
7,283,916 B2 10/2007 Cahill-O'Brien et al.
7,298,134 B2 11/2007 Weikel et al.
7,298,135 B2 11/2007 Briese et al.
7,301,476 B2 11/2007 Shuey et al.
7,308,369 B2 12/2007 Rudran et al.
7,308,370 B2 12/2007 Mason et al.
7,312,721 B2 12/2007 Mason et al.
7,315,162 B2 1/2008 Shuey
7,317,404 B2 1/2008 Cumeralto et al.
7,327,998 B2 2/2008 Kumar et al.
7,336,200 B2 2/2008 Osterloh et al.
7,339,805 B2 3/2008 Hemminger et al.
7,346,030 B2 3/2008 Cornwall
7,348,769 B2 3/2008 Ramirez
7,355,867 B2 4/2008 Shuey
7,362,232 B2 4/2008 Holle et al.
7,362,236 B2 4/2008 Hoiness
7,365,687 B2 4/2008 Borleske et al.
7,417,420 B2 8/2008 Shuey
7,417,557 B2 8/2008 Osterloh et al.
7,421,205 B2 9/2008 Ramirez
7,427,927 B2 9/2008 Borleske et al.
7,453,373 B2 11/2008 Cumeralto et al.
7,471,516 B2 12/2008 Voisine
7,479,895 B2 1/2009 Osterloh et al.
7,486,056 B2 2/2009 Shuey
7,495,578 B2 2/2009 Borleske
7,504,821 B2 3/2009 Shuey
7,505,453 B2 3/2009 Carpenter et al.
7,510,422 B2 3/2009 Showcatally et al.
7,516,026 B2 4/2009 Cornwall et al.
7,535,378 B2 5/2009 Cornwall
7,540,766 B2 6/2009 Makinson et al.
7,545,135 B2 6/2009 Holle et al.
7,545,285 B2 6/2009 Shuey et al.
7,561,062 B2 7/2009 Schleich et al.
7,561,399 B2 7/2009 Slater et al.
7,583,203 B2 9/2009 Uy et al.
7,584,066 B2 9/2009 Roytelman
7,616,420 B2 11/2009 Slater et al.
7,626,489 B2 12/2009 Berkman et al.
7,630,863 B2 12/2009 Zewigle et al.
7,639,000 B2 12/2009 Briese et al.
7,656,649 B2 2/2010 Loy et al.
7,671,814 B2 3/2010 Savage et al.
7,683,642 B2 3/2010 Martin et al.
7,688,060 B2 3/2010 Briese et al.
7,688,061 B2 3/2010 Briese et al.
7,696,941 B2 4/2010 Cunningham, Jr.
7,701,199 B2 4/2010 Makinson et al.
7,702,594 B2 4/2010 Scoggins et al.
7,729,810 B2 * 6/2010 Bell et al. .................... 700/295
7,729,852 B2 6/2010 Hoiness et al.
7,742,430 B2 6/2010 Scoggins et al.
7,746,054 B2 6/2010 Shuey
7,747,400 B2 6/2010 Voisine
7,747,534 B2 6/2010 Villicana et al.
7,756,030 B2 7/2010 Clave et al.
7,756,078 B2 7/2010 Van Wyk et al.
7,756,651 B2 7/2010 Holdsclaw
7,761,249 B2 7/2010 Ramirez
7,764,714 B2 7/2010 Monier et al.
7,860,672 B2 12/2010 Richeson et al.
8,301,314 B2 10/2012 Deaver, Sr. et al.
8,437,883 B2 5/2013 Powell et al.
8,577,510 B2 11/2013 Powell et al.
8,583,520 B1 11/2013 Forbes, Jr.
2002/0109607 A1 8/2002 Cumeralto et al.
2002/0128748 A1 9/2002 Krakovich et al.
2002/0158774 A1 10/2002 Johnson et al.
2003/0001754 A1 1/2003 Johnson et al.
2003/0122686 A1 7/2003 Ehrke et al.
2003/0187550 A1 10/2003 Wilson et al.
2004/0061625 A1 4/2004 Ehrke et al.
2004/0066310 A1 4/2004 Ehrke et al.
2004/0070517 A1 4/2004 Ehrke et al.
2004/0119458 A1 6/2004 Heuell et al.
2004/0150575 A1 8/2004 Lizalek et al.
2004/0192415 A1 9/2004 Luglio et al.
2004/0218616 A1 11/2004 Ardalan et al.
2004/0222783 A1 11/2004 Loy
2005/0024235 A1 2/2005 Shuey et al.
2005/0090995 A1 4/2005 Sonderegger
2005/0110480 A1 5/2005 Martin et al.
2005/0119841 A1 6/2005 Martin
2005/0119930 A1 6/2005 Simon
2005/0212689 A1 9/2005 Randall
2005/0218873 A1 10/2005 Shuey et al.
2005/0237047 A1 10/2005 Voisine
2005/0240314 A1 10/2005 Martinez
2005/0251401 A1 11/2005 Shuey
2005/0251403 A1 11/2005 Shuey
2005/0270015 A1 12/2005 Hemminger et al.
2005/0278440 A1 12/2005 Scoggins
2006/0001415 A1 1/2006 Fridholm et al.
2006/0012935 A1 1/2006 Murphy
2006/0038548 A1 2/2006 Shuey
2006/0043961 A1 3/2006 Loy
2006/0044157 A1 3/2006 Peters et al.
2006/0044851 A1 3/2006 Lancaster et al.
2006/0055610 A1 3/2006 Borisov et al.
2006/0056493 A1 3/2006 Cornwall et al.
2006/0071810 A1 4/2006 Scoggins et al.
2006/0071812 A1 4/2006 Mason, Jr. et al.
2006/0074556 A1 4/2006 Hoiness et al.
2006/0074601 A1 4/2006 Hoiness et al.
2006/0085147 A1 4/2006 Cornwall et al.
2006/0114121 A1 6/2006 Cumeralto et al.
2006/0126255 A1 6/2006 Slater et al.
2006/0145685 A1 7/2006 Ramirez
2006/0145890 A1 7/2006 Junker et al.
2006/0158177 A1 7/2006 Ramirez
2006/0158348 A1 7/2006 Ramirez
2006/0168804 A1 8/2006 Loy et al.
2006/0202858 A1 9/2006 Holle et al.
2006/0206433 A1 9/2006 Scoggins
2006/0217936 A1 9/2006 Mason et al.
2006/0224335 A1 10/2006 Borleske et al.
2006/0232433 A1 10/2006 Holle et al.
2006/0261973 A1 11/2006 Junker et al.
2007/0013549 A1 1/2007 Schleich et al.
2007/0063868 A1 3/2007 Borleske
2007/0073866 A1 3/2007 Rudran et al.
2007/0091548 A1 4/2007 Voisine
2007/0096769 A1 5/2007 Shuey
2007/0115022 A1 5/2007 Hemminger et al.
2007/0124109 A1 5/2007 Timko et al.
2007/0124262 A1 5/2007 Uy et al.
2007/0147268 A1 6/2007 Kelley et al.
2007/0177319 A1 8/2007 Hirst
2007/0200729 A1 8/2007 Borleske et al.
2007/0205915 A1 9/2007 Shuey et al.
2007/0213880 A1 9/2007 Ehlers
2007/0222421 A1 9/2007 Labuschagne
2007/0229305 A1 10/2007 Bonicatto et al.
2007/0236362 A1 10/2007 Brian et al.
2007/0257813 A1 11/2007 Vaswani et al.
2007/0262768 A1 11/2007 Holdsclaw
2007/0271006 A1 11/2007 Golden et al.
2008/0001779 A1 1/2008 Cahill-O'Brien et al.
2008/0007247 A1 1/2008 Gervals et al.
2008/0007426 A1 1/2008 Morand

(56) References Cited

U.S. PATENT DOCUMENTS

| | | | |
|---|---|---|---|
| 2008/0010212 | A1 | 1/2008 | Moore et al. |
| 2008/0012550 | A1 | 1/2008 | Shuey |
| 2008/0018492 | A1 | 1/2008 | Ehrke et al. |
| 2008/0024115 | A1 | 1/2008 | Makinson et al. |
| 2008/0062055 | A1 | 3/2008 | Cunningham |
| 2008/0068004 | A1 | 3/2008 | Briese et al. |
| 2008/0068005 | A1 | 3/2008 | Briese et al. |
| 2008/0068006 | A1 | 3/2008 | Briese et al. |
| 2008/0079741 | A1 | 4/2008 | Martin et al. |
| 2008/0088475 | A1 | 4/2008 | Martin |
| 2008/0097707 | A1 | 4/2008 | Voisine |
| 2008/0111526 | A1 | 5/2008 | Shuey |
| 2008/0116906 | A1 | 5/2008 | Martin et al. |
| 2008/0129420 | A1 | 6/2008 | Borisov et al. |
| 2008/0129537 | A1 | 6/2008 | Osterloh et al. |
| 2008/0143491 | A1 | 6/2008 | Deaver |
| 2008/0144548 | A1 | 6/2008 | Shuey et al. |
| 2008/0180274 | A1 | 7/2008 | Cumeralto et al. |
| 2008/0204272 | A1 | 8/2008 | Ehrke et al. |
| 2008/0204953 | A1 | 8/2008 | Shuey |
| 2008/0218164 | A1 | 9/2008 | Sanderford |
| 2008/0219210 | A1 | 9/2008 | Shuey et al. |
| 2008/0224891 | A1 | 9/2008 | Ehrke et al. |
| 2008/0238714 | A1 | 10/2008 | Ehrke et al. |
| 2008/0238716 | A1 | 10/2008 | Ehrke et al. |
| 2008/0266133 | A1 | 10/2008 | Martin |
| 2009/0003214 | A1 | 1/2009 | Vaswani et al. |
| 2009/0003232 | A1 | 1/2009 | Vaswani et al. |
| 2009/0003243 | A1 | 1/2009 | Vaswani et al. |
| 2009/0003356 | A1 | 1/2009 | Vaswani et al. |
| 2009/0015234 | A1 | 1/2009 | Voisine et al. |
| 2009/0062970 | A1 | 3/2009 | Forbes, Jr. et al. |
| 2009/0096211 | A1 | 4/2009 | Stiesdal |
| 2009/0134996 | A1 | 5/2009 | White, II et al. |
| 2009/0146839 | A1 | 6/2009 | Reddy et al. |
| 2009/0153356 | A1 | 6/2009 | Holt |
| 2009/0167558 | A1 | 7/2009 | Borleske |
| 2009/0187284 | A1 | 7/2009 | Kreiss et al. |
| 2009/0224940 | A1 | 9/2009 | Cornwall |
| 2009/0245270 | A1 | 10/2009 | Van Greunen et al. |
| 2009/0256364 | A1 | 10/2009 | Gadau et al. |
| 2009/0262642 | A1 | 10/2009 | Van Greunen et al. |
| 2009/0265042 | A1 | 10/2009 | Molenkopf |
| 2009/0276170 | A1 | 11/2009 | Bickel |
| 2009/0278708 | A1 | 11/2009 | Kelley |
| 2009/0281673 | A1 | 11/2009 | Taft |
| 2009/0281679 | A1 | 11/2009 | Taft et al. |
| 2009/0284251 | A1 | 11/2009 | Makinson et al. |
| 2009/0287428 | A1 | 11/2009 | Holdsclaw |
| 2009/0294260 | A1 | 12/2009 | Makinson et al. |
| 2009/0295371 | A1 | 12/2009 | Pontin et al. |
| 2009/0296431 | A1 | 12/2009 | Borisov |
| 2009/0299660 | A1 | 12/2009 | Winter |
| 2009/0299884 | A1 | 12/2009 | Chandra |
| 2009/0300191 | A1 | 12/2009 | Pace et al. |
| 2009/0309749 | A1 | 12/2009 | Gilbert et al. |
| 2009/0309756 | A1 | 12/2009 | Mason |
| 2009/0310511 | A1 | 12/2009 | Vaswani et al. |
| 2009/0312881 | A1 | 12/2009 | Venturini et al. |
| 2009/0319093 | A1 | 12/2009 | Joos et al. |
| 2010/0007521 | A1 | 1/2010 | Cornwall |
| 2010/0007522 | A1 | 1/2010 | Morris |
| 2010/0010700 | A1 | 1/2010 | Hoiness et al. |
| 2010/0013632 | A1 | 1/2010 | Salewske et al. |
| 2010/0026517 | A1 | 2/2010 | Cumeralto et al. |
| 2010/0036624 | A1 | 2/2010 | Martin et al. |
| 2010/0036625 | A1 | 2/2010 | Martin et al. |
| 2010/0040042 | A1 | 2/2010 | Van Greunen et al. |
| 2010/0045479 | A1 | 2/2010 | Schamber et al. |
| 2010/0060259 | A1 | 3/2010 | Vaswani et al. |
| 2010/0061350 | A1 | 3/2010 | Flammer, III |
| 2010/0073193 | A1 | 3/2010 | Flammer, III |
| 2010/0074176 | A1 | 3/2010 | Flammer, II et al. |
| 2010/0074304 | A1 | 3/2010 | Flammer, III |
| 2010/0094479 | A1 | 4/2010 | Keefe |
| 2010/0103940 | A1 | 4/2010 | Van Greunen et al. |
| 2010/0109650 | A1 | 5/2010 | Briese et al. |
| 2010/0110617 | A1 | 5/2010 | Savage et al. |
| 2010/0117856 | A1 | 5/2010 | Sonderegger |
| 2010/0128066 | A1 | 5/2010 | Murata et al. |
| 2010/0134089 | A1 | 6/2010 | Uram et al. |
| 2010/0150059 | A1 | 6/2010 | Hughes et al. |
| 2010/0157838 | A1 | 6/2010 | Vaswani et al. |
| 2010/0188254 | A1 | 7/2010 | Johnson et al. |
| 2010/0188255 | A1 | 7/2010 | Cornwall |
| 2010/0188256 | A1 | 7/2010 | Cornwall et al. |
| 2010/0188257 | A1 | 7/2010 | Johnson |
| 2010/0188258 | A1 | 7/2010 | Cornwall et al. |
| 2010/0188259 | A1 | 7/2010 | Johnson et al. |
| 2010/0188260 | A1 | 7/2010 | Cornwall et al. |
| 2010/0188263 | A1 | 7/2010 | Cornwall et al. |
| 2010/0188938 | A1 | 7/2010 | Johnson et al. |
| 2010/0192001 | A1 | 7/2010 | Cornwall et al. |
| 2010/0217550 | A1 | 8/2010 | Crabtree et al. |
| 2010/0286840 | A1* | 11/2010 | Powell et al. ................ 700/295 |
| 2011/0025130 | A1 | 2/2011 | Hadar et al. |
| 2012/0041696 | A1 | 2/2012 | Sanderford, Jr. et al. |
| 2012/0053751 | A1 | 3/2012 | Børresen et al. |
| 2012/0136638 | A1 | 5/2012 | Deschamps et al. |
| 2012/0221265 | A1 | 8/2012 | Arya et al. |
| 2012/0249278 | A1 | 10/2012 | Krok et al. |
| 2013/0030591 | A1* | 1/2013 | Powell et al. ................ 700/295 |
| 2014/0277788 | A1 | 9/2014 | Forbes, Jr. |

FOREIGN PATENT DOCUMENTS

| | | | |
|---|---|---|---|
| JP | S57-148533 | A | 9/1982 |
| JP | 63-299722 | A | 12/1988 |
| JP | H10-164756 | A | 6/1998 |
| JP | 2002-247780 | A | 8/2002 |
| JP | 2004-096906 | A | 3/2004 |
| JP | 2006-208047 | A | 8/2006 |
| JP | 2009-33811 | A | 2/2009 |
| JP | 2009-65817 | A | 3/2009 |
| RU | 2066084 | | 8/1996 |
| RU | 2200364 | | 3/2003 |
| SU | 14733008 | | 4/1989 |
| WO | WO 98/26489 | | 6/1998 |
| WO | WO 2008/144860 | A1 | 12/2008 |

OTHER PUBLICATIONS

Kennedy, P. E. et al., "Conservation Voltage Reduction (CVR) at Snohmish County PUD," Transactions on Power Systems, vol. 6, No. 3, Aug. 1991, pp. 986-998.

Paseraba, J., Secondary Voltage-Var Controls Applied to Static Compensators (STATCOMs) for Fast Voltage Control and Long Term Var Management, 2002 IEEE Power Engineering Society Summer Meeting. Jul. 25, 2002. Chicago, IL, vol. 2 pp. 753-761 <DOI: 10.1109/PESS.2002.1043415>.

Willis, H. L., "Power Distribution Planning Reference Book." Second Edition, Revised and Expanded, Chapter 10, pp. 356-363 and 387, 2004.

Wilson, T. L., "Measurement and Verification of Distribution Voltage Optimization Results for the IEEE Power & Energy Society", 2010, pp. 1-9.

International Search Report and Written Opinion of the International searching Authority mailed Dec. 20, 2010 on related PCT Appln. PCT/US2010/033751.

International Search Report and Written Opinion of the International searching Authority mailed Jul. 24, 2014 on related PCT Appln. PCT/US2014/027332.

International Search Report and Written Opinion of the International searching Authority mailed Jul. 29, 2014 on related PCT Appln. PCT/US2014/027299.

International Search Report and Written Opinion of the International searching Authority mailed Aug. 7, 2014 on related PCT Appln. PCT/US2014/027310.

International Search Report and Written Opinion of the International searching Authority mailed Sep. 5, 2014 on related PCT Appln. PCT/US2014/27361.

(56) References Cited

OTHER PUBLICATIONS

Williams, B. R., "Distribution Capacitor Automation Provides Integrated Control of Customer Voltage Levels and Distribution Reactive Power Flow," Southern California Edison Company, Power Industry Computer Application Conference, 1995, Conference Proceedings, pp. 215-220.
H. Lee Willis, *Automated Planning Tools and Methods*, Power Distribution Planning Reference Book, Second Edition, Revised and Expanded, Chapter 24, pp. 869-907.
American National Standard for Electric Power Systems and Equipment Voltage Ratings (60 Hertz); National Electrical Manufactures Association, Approved Dec. 6, 2006, American National Standards Institue, Inc., pp. 1-23.
Byron Flynn, "Key Smart Grid Applications", Protection & Control Journal, Jul. 2009, pp. 29-34.
Carl LaPlace, et al. Realizing the Smart Grid of the Future through AMI technology, 14 pages, Jun. 1, 2009.
International Search Report and Written Opinion of the International Searching Authority mailed Sep. 24, 2015 on related PCT Appln. PCT/US2014/027332.

* cited by examiner

THE VOLTAGE OPTIMIZATION PROBLEM

- THE SYSTEM MODEL

- POWER FLOW LOSSES FROM THE ESS TO THE EUS $$\left\{ (V_S - V_{AMI}) = B \times P_{LOSS} \right\}$$ PER UNIT OF AMI Kw

- POWER FLOW LOSS FROM THE EUS TO THE EDS FROM CVR $$\left\{ (V_{AMIon} - V_{AMIoff}) = B \times P_{LOSS} \right\}$$

- LTC AND REGULATOR $V_S$ TO $V_{AMI}$

- LINEAR REGRESSION MODEL

MANAGEMENT OF ENERGY DEMAND AND ENERGY EFFICIENCY SAVINGS FROM VOLTAGE OPTIMIZATION ON ELECTRIC POWER SYSTEMS USING AMI-BASED DATA ANALYSIS

This application claims priority under 35 U.S.C. §119(e) to U.S. provisional patent application 61/800,028 filed on Mar. 15, 2013, which is hereby incorporated by reference in its entirety herein.

BACKGROUND

The present disclosure relates to a method, an apparatus, a system and a computer program for controlling an electric power system, including controlling the voltage on the distribution circuits with respect to optimizing voltage, conserving energy, reducing demand and improving reliability. More particularly, the disclosure relates to a method of controlling energy efficiency, electrical demand and customer voltage reliability using advanced metering infrastructure ("AMI")-based data analysis. This method enables the direct control of customer level secondary voltages to optimally reduce energy usage and electrical demand for an electric energy delivery system (EEDS). The method executes voltage control using the secondary AMI-based measurements, significantly improving the accuracy of the customer voltage measurement and level, enabling the EEDS operator to improve the reliability of customer voltage performance.

Electricity is commonly generated at a power station by electromechanical generators, which are typically driven by heat engines fueled by chemical combustion or nuclear fission, or driven by kinetic energy flowing from water or wind. The electricity is generally supplied to end users through transmission grids as an alternating current signal. The transmission grids may include a network of power stations, transmission circuits, substations, and the like.

The generated electricity is typically stepped-up in voltage using, for example, generating step-up transformers, before supplying the electricity to a transmission system. Stepping up the voltage improves transmission efficiency by reducing the electrical current flowing in the transmission system conductors, while keeping the power transmitted nearly equal to the power input. The stepped-up voltage electricity is then transmitted through the transmission system to a distribution system, which distributes the electricity to end users. The distribution system may include a network that carries electricity from the transmission system and delivering it to end users. Typically, the network may include medium-voltage (for example, less than 69 kV) power lines, electrical substations, transformers, low-voltage (for example, less than 1 kV) distribution wiring, electric meters, and the like.

The following, the entirety of each of which is herein incorporated by reference, describe subject matter related to power generation or distribution: Engineering Optimization Methods and Applications, First Edition, G. V. Reklaitis, A. Ravindran, K. M. Ragsdell, John Wiley and Sons, 1983; Estimating Methodology for a Large Regional Application of Conservation Voltage Reduction, J. G. De Steese, S. B. Merrick, B. W. Kennedy, IEEE Transactions on Power Systems, 1990; Power Distribution Planning Reference Book, Second Edition, H. Lee Willis, 2004; Implementation of Conservation Voltage Reduction at Commonwealth Edison, IEEE Transactions on Power Systems, D. Kirshner, 1990; Conservation Voltage Reduction at Northeast Utilities, D. M. Lauria, IEEE, 1987; Green Circuit Field Demonstrations, EPRI, Palo Alto, Calif., 2009, Report 1016520; Evaluation of Conservation Voltage Reduction (CVR) on a National Level, PNNL-19596, Prepared for the U.S. Department of Energy under Contract DE-ACO5-76RL01830, Pacific Northwest National Lab, July 2010; Utility Distribution System Efficiency Initiative (DEI) Phase 1, Final Market Progress Evaluation Report, No 3, E08-192 (July 2008) E08-192; Simplified Voltage Optimization (VO) Measurement and Verification Protocol, Simplified VO M&V Protocol Version 1.0, May 4, 2010; MINITAB Handbook, Updated for Release 14, fifth edition, Barbara Ryan, Brian Joiner, Jonathan Cryer, Brooks/Cole-Thomson, 2005; Minitab Software, http://www.minitab.com/en-US/products/minitab/Statistical Software provided by Minitab Corporation.

Further, U.S. patent application 61/176,398, filed on May 7, 2009 and US publication 2013/0030591 entitled VOLTAGE CONSERVATION USING ADVANCED METERING INFRASTRUCTURE AND SUBSTATION CENTRALIZED VOLTAGE CONTROL, the entirety of which is herein incorporated by reference, describe a voltage control and energy conservation system for an electric power transmission and distribution grid configured to supply electric power to a plurality of user locations.

SUMMARY

Various embodiments described herein provide a novel method, apparatus, system and computer program for controlling an electric power system, including implementation of voltage control using AMI-based secondary voltage measurement to optimally control the voltages for load tap changing control (LTC) transformers, voltage regulators, capacitor banks, and distributed generation, storage and high variation loads such as photovoltaic generation, electric vehicle charging and microgrids.

According to an aspect of the disclosure, the voltage control and conservation system (VCC) controls the electrical energy delivery system (EEDS) primary and secondary independent voltage control devices such as load tap changing control (LTC) transformers, voltage regulators, capacitor banks, and distributed generation, storage, photovoltaic generation, and microgrids to optimize the energy losses while improving the reliability of the voltage delivered to the energy usage system (EUS). The electrical energy delivery system (EEDS) is made up of an energy supply system (ESS) that connects electrically to one or more energy usage systems (EUS). The energy usage system (EUS) supplies voltage and energy to energy usage devices (EUD) at electrical points on an electrical energy delivery system (EEDS) and the EUS is made up of many energy usage devices (EUD) randomly using energy at any given time. The purpose of the energy validation process (EVP) is to operate the voltage levels of the EEDS in a manner that optimizes the energy losses EEDS, EUS and ESS. The electrical energy supply to the electrical energy delivery system (EEDS) is measured in watts, kilowatts (kw), or Megawatts (Mw) at the supply point of the ESS and at the energy user system (EUS) or meter point. This measurement records the average usage of energy (AUE) over set time periods such as one hour. The energy and voltage measurements made within the EEDS are communicated back to a central control using a communication network for processing by the VCC which then issues control changes to the primary and secondary voltage control devices to produce more precise and reliable voltage control that optimally minimizes the energy losses for the EEDS.

According to a further aspect of the disclosure, the energy validation process (EVP) measures the level of change in energy usage for the electrical energy delivery system (EEDS) that is made up of an energy supply system (ESS) that connects electrically to one or more energy usage systems (EUS). The test for the level of change in energy use improvement is divided into two basic time periods: The first is the time period when the VCC is not operating, i.e., in the "OFF" state. The second time period is when the VCC is operating, i.e., in "ON" state. Two variables must be determined to estimate the savings capability for an improvement in the EEDS: The available change in voltage created by the VCC and the EEDS capacity for energy change with respect to voltage change or the CVR factor. The average change in voltage is determined by direct measurement on the advanced metering infrastructure (AMI). The details regarding the calculation of the CVR factor and average voltage change are described in co-pending patent application No. 61/789,085, entitled ELECTRIC POWER SYSTEM CONTROL WITH MEASUREMENT OF ENERGY DEMAND AND ENERGY EFFICIENCY USING T—DISTRIBUTIONS, filed on Mar. 15, 2013 ("the co-pending/P006 application"), the entirety of which is incorporated herein.

According to an aspect of the disclosure, the energy planning process (EPP) projects the voltage range capability of a given electrical energy delivery system (EEDS) (made up of an energy supply system (ESS) that connects electrically via the electrical energy distribution connection system (EEDCS) to one or more energy usage systems (EUS)) at the customer secondary level (the EUS) by measuring the level of change in energy usage from voltage management for the EEDS. The EPP can also determine potential impacts of proposed modifications to the equipment and/or equipment configuration of the EEDS and/or to an energy usage device (EUD) at some electrical point(s) on an electrical energy delivery system (EEDS) made up of many energy usage devices randomly using energy at any given time during the measurement. The purpose of the energy validation process (EVP) is to measure the level of change in energy usage for the EEDS for a change in voltage level. The specifics of the EVP are covered in the co-pending/P006 application. One purpose of the EPP system of the disclosed embodiments is to estimate the capability of the EEDS to accommodate voltage change and predict the level of change available. The potential savings in energy provided by the proposed modification to the system can be calculated by multiplying the CVR factor (% change in energy/% change in voltage) (as may be calculated by the EVP, as described in the co-pending/P006 application) by the available change in voltage (as determined by the EPP) to determine the available energy and demand savings over the time interval being studied. The electrical energy supply to the electrical energy delivery system (EEDS) is measured in watts, kilowatts (kw), or Megawatts (Mw) (a) at the supply point of the ESS and (b) at the energy user system (EUS) or meter point. This measurement records the average usage of energy (AUE) at each of the supply and meter points over set time periods such as one hour.

The test for energy use improvement is divided into two basic time periods: The first is the time period when the improvement is not included, i.e., in "OFF" state. The second time period is when the improvement is included, i.e., in "ON" state. Two variables must be determined to estimate the savings capability for a modification in the EEDS: The available voltage change in voltage created by the modification and the EEDS capacity for energy change with respect to voltage change (the CVR factor, the calculation of which is described in the co-pending/P006 application).

According to a further aspect of the disclosure, the VCC uses the EVP and the EPP to enable the full optimization of the voltage, both during planning and construction of the EEDS components and during the operation of the EEDS by monitoring the EVP process to detect when the system changes its efficiency level. When these three processes (VCC, EVP and EPP) are operating together, it is possible to optimize the construction and the operation of the EEDS. The EPP optimizes the planning and construction of the EEDS and its components and the EVP is the measurement system to allow the VCC to optimize the operation of the EEDS. The EPP provides the configuration information for the VCC based on the information learned in the planning optimization process. This full optimization is accomplished across the energy efficiency, demand management and the voltage reliability of the EEDS.

According to a further aspect of the disclosure, the EEDS can be represented as a linear model over the restricted voltage range of operational voltages allowed for the EUS. This narrow band of operation is where the optimization solution must occur, since it is the band of actual operation of the system. The linear models are in two areas. The first area for use of linear models is that energy loss for the EEDCS primary and secondary equipment losses can be represented in linear form using some simple approximations for EEDCS characteristics of voltage and energy. This second approximation is that the voltage and energy relationship of the EUS can be represented by the CVR factor and the change in voltage over a given short interval. This allows the entire loss function for the EEDS over reasonably short interval and narrow ranges of voltage (+/−10%) to be represented as linear functions of measurable voltages at the ESS and the EUS. This linear relationship greatly reduces the complexity of finding the optimum operating point to minimize energy use on the EEDS. The second area for use of linear models is an approximation that the EUS voltages can be represented by linear regression models based only on the EUS voltage and energy measurements. These two approximations greatly reduce the optimization solution to the EEDS VCC, making the optimization process much simpler.

The calculation of the change in voltage capability is the novel approach to conservation voltage reduction planning using a novel characterization of the EEDS voltage relationships that does not require a detailed loadflow model to implement. The input levels to the EEDCS from the ESS are recorded at set intervals, such as one hour periods for the time being studied. The input levels to the EUS from the EEDCS, at the same intervals for the time being studied, are measured using the AMI system and recorded. The EEDS specific relationship between the ESS measurements and the EUS usage measurements is characterized using a linear regression technique over the study period. This calculation specifically relates the effects of changes in load at the ESS to change in voltage uniquely to each customer EUS using a common methodology.

Once these linear relationships have been calculated, a simple linear model is built to represent the complex behavior of voltage at various loading levels including the effects of switching unique EUS specific loads that are embedded in the AMI collected data (e.g., the data includes the "ON" and "OFF" nature of the load switching occurring at the EUS). Then, the linear model for the voltages is passed to the VCC for determining the normal operation of the EUS for specific conditions at the ESS. Using this simple linear model is a novel method of planning and predicting the voltage behavior of an EEDS caused by modifications to the EEDS by using the VCC.

The relationships between the modification (e.g., adding/removing capacitor banks, adding/removing regulators, reducing impedance, or adding distributed generation) are developed first by using a simple system of one ESS and a simple single phase line and a single EUS with a base load and two repeating switched loads. By comparing a traditional primary loadflow model of the simplified EEDS to the linear statistical representation of the voltage characteristics, the linear model changes can be obtained to relate the EUS voltage changes resulting from capacitor bank operation. Once this is done, the effects on the EUS voltage can be forecasted by the VCC and used to determine whether the optimum operating point has been reached.

Once the linear model is built then the model can be used to apply simple linear optimization to determine the best method of controlling the EEDS to meet the desired energy efficiency, demand and reliability improvements.

According to a further aspect of the disclosure, the energy planning process (EPP) can be used to take the AMI data from multiple AMI EUS points and build a linear model of the voltage using the linearization technique. These multiple point models can be used to predict voltage behavior for a larger radial system (e.g., a group of contiguous transmission elements that emanate from a single point of connection) by relating the larger system linear characteristics to the system operation of capacitor banks, regulators, and LTC transformers. With the new linear models representing the operation of the independent variables of the EEDS, the optimization can determine the optimum settings of the independent variables that will minimize the linear model of the EEDS losses. This optimum control characteristics are passed from the EVP to the VCC in the configuration process.

According to a further aspect of the disclosure, the energy planning process (EPP) can be used to take the AMI data from multiple AMI EUS points and multiple ESS points and build a linear model of the voltage using the linearization technique. The linear model that exists for normal operation can be determined based on the characteristics of the linearization. Using this normal operation model as a "fingerprint", the other EUS points on the EEDS can be filtered to determine the ones, if any, that are displaying abnormal behavior characteristics and the abnormal EUS points can be compared against a list of expected characteristics denoting specific abnormal behavior that represents the potential of low reliability performance. As an example, the characteristics of a poorly connected meter base has been characterized to have certain linear characteristics in the model. The observed linear characteristics that represent this abnormal condition can be used to identify any of the EUS meters that exhibit this behavior, using the voltage data from AMI. This allows resolution of the abnormality before customer equipment failure occurs and significantly improves the reliability of the EEDS. A set of the voltage fingerprints will be passed by the EVP to the VCC in the configuration process. The EPP can then use this recognition to provide alarms, change operation level for efficiency, demand or reliability improvement.

According to a further aspect of the disclosure, the energy planning process (EPP) can be used to take the AMI data from multiple AMI EUS points and multiple ESS points and build a linear model of the voltage using the linearization technique. Using this model and the measured AMI data the EPP can be used to project the initial group of monitored meters that can be used in the voltage management system to control the minimum level of voltage across the EEDS for implementation of CVR. This information is passed from the EPP to the VCC in the configuration process.

According to a further aspect of the disclosure, the energy planning process (EPP) can be used to take the AMI data from multiple AMI EUS points and multiple ESS points and build a linear model of the voltage using the linearization technique. The voltage data can be used to provide location information about the meter connection points on the circuit using voltage correlation analysis. This method matches the voltages by magnitude and by phase using a technique that uses the voltage data for each meter to provide the statistical analysis. Common phase voltage movement is correlated and common voltage movement by circuit is identified using linear regression techniques. This information is provided by the EPP to the VCC in the configuration process and used to detect when voltages in the monitored group are not from the EEDS being controlled. This enables the VCC to stop control and return itself to a safe mode until the problem is resolved.

According to a further aspect of the disclosure, the VCC samples the monitored group voltages at the EUS and uses the linear models to project the required level of independent variables required to make the EUS voltages remain in the required voltage band based on the linear regression model for the EUS location. This sampling also allows the VCC to determine when the samples are greatly deviating from the linear regression model and enable alarming and change of VCC state to maintain reliability of the EEDS.

According to a further aspect of the disclosure, the devices that represent the voltage regulation on the circuit, LTC transformers, regulators, and distributed generation are assigned non overlapping zones of control in the EEDS. In each zone there is one parent device and for the EEDS there is also one substation parent device (node parent device) that controls all other zones and devices. The EEDS topology determines which zones are secondary to the node zone and the relationship to other zones. In each of these zones there are other independent devices that form child devices such as capacitor banks. These are controlled by their zone parent control. The control processing proceeds by zone topology to implement the optimization process for the EEDS. For each zone control device and child device a monitored group of meters are assigned and used to initiate control point changes that implement the optimization process for the EEDS. This control process only requires the configuration information from the EPP and measurements of voltages from the monitored meters at the EUS and measurements of the meters at the ESS to determine the optimization and control the independent devices/variables of the optimization solution.

According to a further aspect of the disclosure, the non-monitored meters in the EEDS provide voltage exception reporting (see the US 2013/0030591 publication) that is used to re-select meters that are detected to be below the existing monitored group level for any device and connect them to the monitored group and disconnect meters that are not representing the lowest/highest of the meters in the EEDS. Monitored groups are maintained to track the upper and lower operating levels of the control device block where the total population of meters affected by the device reside.

According to a further aspect of the disclosure, the solution to the optimization of the EEDS is determined. The first step is to define the boundary of the optimization problem. The optimization deals with the EEDS, the ESS, the EEDCS, the EUS and the energy delivery (ED) system (EDS) and involves the voltage and energy relationships in these systems. The second step is to determine the performance criterion. This performance criterion is the energy loss from the ESS to the EUS that occurs in the EEDCS and the energy loss in the EUS and ED from CVR. The first loss is normally less than 5% of the total controllable losses from the voltage optimization. The second energy loss is the conservation voltage reduction loss in the EUS that is a combination of all of the CVR losses in the ED connected to the EUS point and is normally 95% of the potential controllable losses. The performance criterion is to minimize these two losses while maintaining or increasing the reliability of the voltage at the EUS and ED. The third steps to determine the independent variable in the optimization problem. The independent variables are the voltages being controlled by the LTC transformers, the voltage regulators, the capacitor bank position, and the EUS/EDS voltage control such as distributed generation voltage controllers. Each of these are specifically represented in the control by the VCC. The next step is creating the system model. The linear model of the losses represent the performance criterion model. The linear model of the ESS to EUS voltages represents the system model for the EEDCS. The final step is to determine the constraints. In this case, the constraints are the voltage range limits on the EUS and ED which are based on the appropriate equipment and operating standards.

The following assumptions were made to evaluate the optimization solution. First, it is assumed that the loads are evenly distributed by block, as defined in the VCC. This is a very reliable assumption since the blocks can be specifically selected. The second is that there is a uniformity between the percentage ESS voltage drop on the primary and the percentage EUS voltage drop on the secondary. With these two assumptions, it is shown that the model is monotonic, decreasing with voltage and with the slope of the voltage on the EEDCS. This means that the reduction in control voltage at the independent variable points always results in a decrease in the voltage at the EUS and a resulting decrease in the losses and if the slope of the voltage is minimized by the capacitor bank position simultaneously, then the application of linear optimization technique shows that the optimum will always occur at a boundary condition. This means that the first boundary condition that is encountered will identify the optimum operating point for the ED to minimize losses. The VCC is an implementation of a control process that implements the search for this boundary condition to assure optimum loss operation base on voltage control.

According to a further aspect of the disclosure, the VCC combines the optimization of the EPP and the optimization of the VCC to produce a simultaneous optimization of both the EEDS design and construction with the VCC operating optimization, to produce a continuous improvement process that cycles through the overall voltage optimization for the EEDS using a Plan, Manage, and Validate process. This continuous improvement process adapts the optimization to the continuously changing EEDS load environment completing the Voltage Optimization process.

Additional features, advantages, and embodiments of the disclosure may be set forth or apparent from consideration of the detailed description and drawings. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

Figure 1:
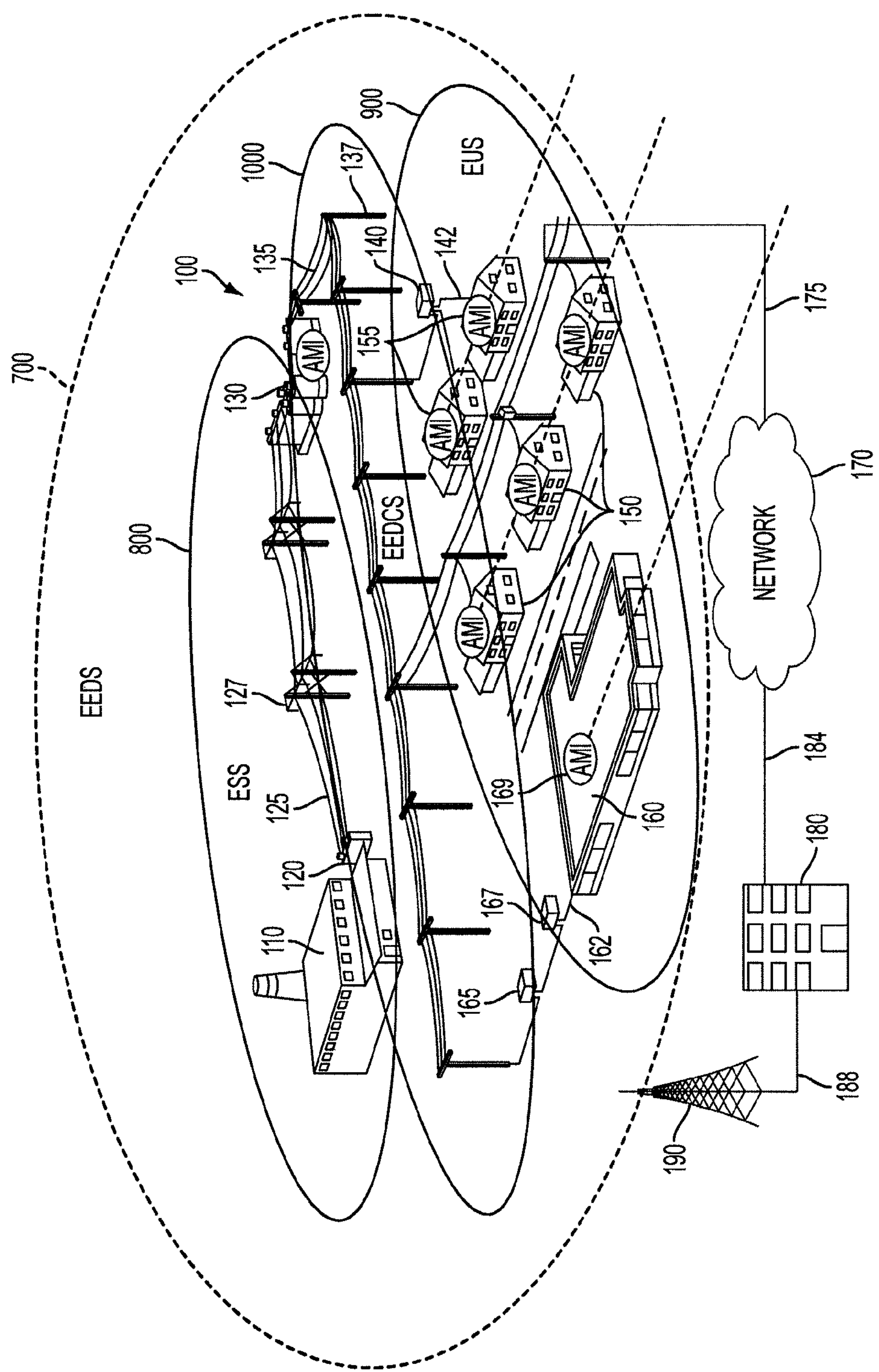
FIG. 1 shows an example of an EEDS made up of an electricity generation and distribution system connected to customer loads, according to principles of the disclosure.

The present disclosure is further described in the detailed description that follows.

DETAILED DESCRIPTION OF THE DISCLOSURE

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

A "computer", as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a super computer, a personal computer, a laptop computer, a palmtop computer, a notebook computer, a desktop computer, a workstation computer, a server, or the like, or an array of processors, microprocessors, central processing units, general purpose computers, super computers, personal computers, laptop computers, palmtop computers, notebook computers, desktop computers, workstation computers, servers, or the like.

A "server", as used in this disclosure, means any combination of software and/or hardware, including at least one application and/or at least one computer to perform services for connected clients as part of a client-server architecture. The at least one server application may include, but is not limited to, for example, an application program that can accept connections to service requests from clients by sending back responses to the clients. The server may be configured to run the at least one application, often under heavy workloads, unattended, for extended periods of time with minimal human direction. The server may include a plurality of computers configured, with the at least one application being divided among the computers depending upon the workload. For example, under light loading, the at least one application can run on a single computer. However, under heavy loading, multiple computers may be required to run the at least one application. The server, or any if its computers, may also be used as a workstation.

A "database", as used in this disclosure, means any combination of software and/or hardware, including at least one application and/or at least one computer. The database may include a structured collection of records or data organized according to a database model, such as, for example, but not limited to at least one of a relational model, a hierarchical model, a network model or the like. The database may include a database management system application (DBMS) as is known in the art. At least one application may include, but is not limited to, for example, an application program that can accept connections to service requests from clients by sending back responses to the clients. The database may be configured to run the at least one application, often under heavy workloads, unattended, for extended periods of time with minimal human direction.

A "communication link", as used in this disclosure, means a wired and/or wireless medium that conveys data or information between at least two points. The wired or wireless medium may include, for example, a metallic conductor link, a radio frequency (RF) communication link, an Infrared (IR) communication link, an optical communication link, or the like, without limitation. The RF communication link may include, for example, WiFi, WiMAX, IEEE 802.11, DECT, 0G, 1G, 2G, 3G or 4G cellular standards, Bluetooth, and the like.

The terms "including", "comprising" and variations thereof, as used in this disclosure, mean "including, but not limited to", unless expressly specified otherwise.

The terms "a", "an", and "the", as used in this disclosure, means "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

A "computer-readable medium", as used in this disclosure, means any medium that participates in providing data (for example, instructions) which may be read by a computer. Such a medium may take many forms, including non-volatile media, volatile media, and transmission media. Non-volatile media may include, for example, optical or magnetic disks and other persistent memory. Volatile media may include dynamic random access memory (DRAM). Transmission media may include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a computer. For example, sequences of instruction (i) may be delivered from a RAM to a processor, (ii) may be carried over a wireless transmission medium, and/or (iii) may be formatted according to numerous formats, standards or protocols, including, for example, WiFi, WiMAX, IEEE 802.11, DECT, 0G, 1G, 2G, 3G or 4G cellular standards, Bluetooth, or the like.

Figure 2:
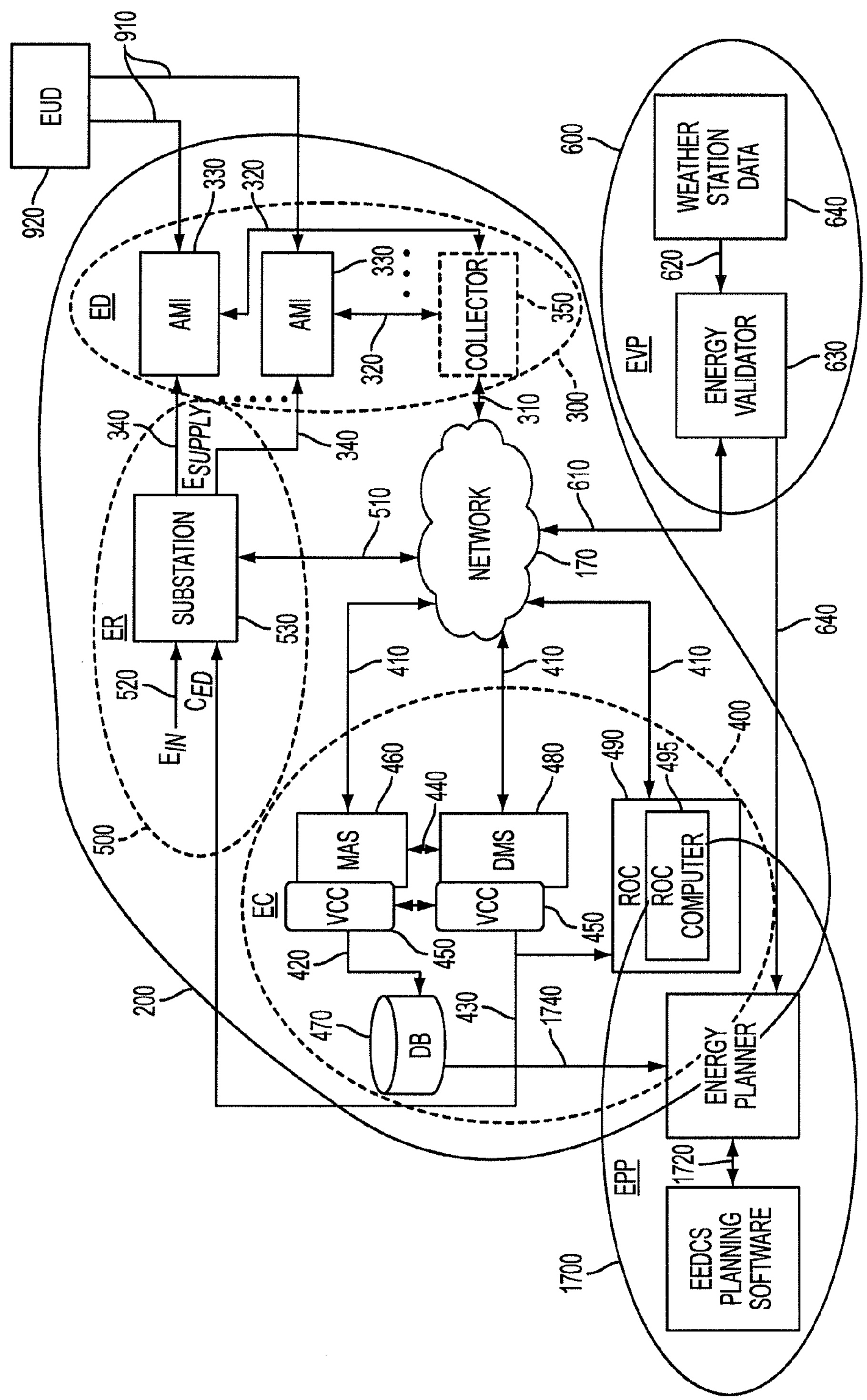
FIG. 2 shows an example of a voltage control and conservation (VCC) system combined with an energy validation process (EVP) and an energy planning process (EPP) that is being measured at the ESS meter point and the EUS meter point made up of Advanced Metering Infrastructure (AMI) measuring voltage and energy, according to the principles of the disclosure.

According to one non-limiting example of the disclosure, a voltage control and conservation (VCC) system 200 is provided (shown in FIG. 2) and the EVP 600 is used to monitor the change in EEDS energy from the VCC 200. The VCC 200, includes three subsystems, including an energy delivery (ED) system 300, an energy control (EC) system 400, an energy regulation (ER) system 500. Also shown in FIG. 2 are an energy validation (EVP) system 600 and an energy planning process (EPP) system 1700. The VCC system 200 is configured to monitor energy usage at the ED system 300 and determine one or more energy delivery parameters at the EC system (or voltage controller) 400. The EC system 400 may then provide the one or more energy delivery parameters $C_{ED}$ to the ER system 500 to adjust the energy delivered to a plurality of users for optimal maximum energy conservation. The EVP system 600 monitors through communications link 610 all metered energy flow and determines the change in energy resulting from a change in voltage control at the ER system 500. The EVP system 600 also reads weather data information through a communication link 620 from an appropriate weather station 640 to execute the EVP process 630. The EVP system 600 is more fully described in the co-pending/P006 application.

The EPP system 1700 reads the historical databases 470 via communication link 1740 for the AMI data. The EPP system 1700 can process this historical data along with measured AMI data to identify problems, if any, on the EEDS system 700. The EPP system 1700 is also able to identify any outlier points in the analysis caused by proposed optimal system modifications and to identify the initial meters to be used for monitoring by VCC system 200 until the adaptive process (discussed in the US 2013/0030591 publication) is initiated by the control system.

The VCC system 200 is also configured to monitor via communication link 610 energy change data from EVP system 600 and determine one or more energy delivery parameters at the EC system (or voltage controller) 400. The EC system 400 may then provide the one or more energy delivery parameters $C_{ED}$ to the ER system 500 to adjust the energy delivered to a plurality of users for maximum energy conservation. Similarly, the EC system 400 may use the energy change data to control the EEDS 700 in other ways. For example, components of the EEDS 700 may be modified, adjusted, added or deleted, including the addition of capacitor banks, modification of voltage regulators, changes to end-user equipment to modify customer efficiency, and other control actions.

The VCC system 200 may be integrated into, for example, an existing load curtailment plan of an electrical power supply system. The electrical power supply system may include an emergency voltage reduction plan, which may be activated when one or more predetermined events are triggered. The predetermined events may include, for example, an emergency, an overheating of electrical conductors, when the electrical power output from the transformer exceeds, for example, 80% of its power rating, or the like. The VCC system 200 is configured to yield to the load curtailment plan when the one or more predetermined events are triggered, allowing the load curtailment plan to be executed to reduce the voltage of the electrical power supplied to the plurality of users.

FIG. 1 is similar to FIG. 1 of US publication 2013/0030591, with overlays that show an example of an EEDS 700 system, including an an ESS system 800, an EUS system 900 and an EEDCS system 1000 based on the electricity generation and distribution system 100, according to principles of the disclosure. The electricity generation and distribution system 100 includes an electrical power generating station 110, a generating step-up transformer 120, a substation 130, a plurality of step-down transformers 140, 165, 167, and users 150, 160. The electrical power generating station 110 generates electrical power that is supplied to the step-up transformer 120. The step-up transformer steps-up the voltage of the electrical power and supplies the stepped-up electrical power to an electrical transmission media 125. The ESS 800 includes the station 110, the step-up transformer 120, the substation 130, the step-down transformers 140, 165, 167, the ER 500 as described herein, and the electrical transmission media, including media 125, for transmitting the power from the station 110 to users 150, 160. The EUS 900 includes the ED 300 system as described herein, and a number of energy usage devices (EUD) 920 that may be consumers of power, or loads, including customer equipment and the like. The EEDCS system 1000 includes transmission media, including media 135, connections and any other equipment located between the ESS 800 and the EUS 900.

As seen in FIG. 1, the electrical transmission media may include wire conductors, which may be carried above ground by, for example, utility poles 127, 137 and/or underground by, for example, shielded conductors (not shown). The electrical power is supplied from the step-up transformer 120 to the substation 130 as electrical power $E_{In}(t)$, where the electrical power $E_{In}$ in MegaWatts (MW) may vary as a function of time t. The substation 130 converts the received electrical power $E_{In}(t)$ to $E_{Supply}(t)$ and supplies the converted electrical power $E_{Supply}(t)$ to the plurality of users 150, 160. The substation 130 may adjustably transform the voltage component $V_{In}(t)$ of the received electrical power $E_{In}(t)$ by, for example, stepping-down the voltage before supplying the electrical power $E_{Supply}(t)$ to the users 150, 160. The electrical power $E_{Supply}(t)$ supplied from the substation 130 may be received by the step-down transformers 140, 165, 167 and supplied to the users 150, 160 through a transmission medium 142, 162, such as, for example, but not limited to, underground electrical conductors (and/or above ground electrical conductors).

Each of the users 150, 160 may include an Advanced Meter Infrastructure (AMI) 330. The AMI 330 may be coupled to a Regional Operations Center (ROC) 180. The ROC 180 may be coupled to the AMI 330, by means of a plurality of communication links 175, 184, 188, a network 170 and/or a wireless communication system 190. The wireless communication system 190 may include, but is not limited to, for example, an RF transceiver, a satellite transceiver, and/or the like.

The network 170 may include, for example, at least one of the Internet, a local area network (LAN), a wide area network (WAN), a metropolitan area network (MAN), a personal area network (PAN), a campus area network, a corporate area network, the electrical transmission media 125, 135 and transformers 140, 165, 167, a global area network (GAN), a broadband area network (BAN), or the like, any of which may be configured to communicate data via a wireless and/or a wired communication medium. The network 170 may be configured to include a network topology such as, for example, a ring, a mesh, a line, a tree, a star, a bus, a full connection, or the like The AMI 330 may include any one or more of the following: A smart meter; a network interface (for example, a WAN interface, or the like); firmware; software; hardware; and the like. The AMI may be configured to determine any one or more of the following: kilo-Watt-hours (kWh) delivered; kWh received; kWh delivered plus kWh received; kWh delivered minus kWh received; interval data; demand data; voltage; current; phase; and the like. If the AMI is a three phase meter, then the low phase voltage may be used in the average calculation, or the values for each phase may be used independently. If the meter is a single phase meter, then the single voltage component will be averaged.

The AMI 330 may further include one or more collectors 350 (shown in FIG. 2) configured to collect AMI data from one or more AMIs 330 tasked with, for example, measuring and reporting electric power delivery and consumption at one or more of the users 150, 160. Alternatively (or additionally), the one or more collectors may be located external to the users 150, 160, such as, for example, in a housing holding the step-down transformers 140, 165, 167. Each of the collectors may be configured to communicate with the ROC 180.

The VCC system 200 plugs into the DMS and AMI systems to execute the voltage control function. In addition the EVP system 600 collects weather data and uses the AMI data from the ESS system 800 to calculate the energy savings level achieved by the VCC system 200. In addition the EPP system 1700 provides a process to continually improve the performance of the EEDS by periodically reviewing the historical AMI voltage data and providing identification of problem EUS voltage performance and the modifications needed to increase the efficiency and reliability of the EEDS system 700, using the VCC system 200.

VCC System 200

FIG. 2 shows an example of the VCC system 200 with the EVP system 600 monitoring the change in energy resulting from the VCC controlling the EEDS in the more efficient lower 5% band of voltage, according to principles of the disclosure. The VCC system 200 includes the ED system 300, the EC system 400 and the ER system 500, each of which is shown as a broken-line ellipse. The VCC system 200 is configured to monitor energy usage at the ED system 300. The ED system 300 monitors energy usage at one or more users 150, 160 (shown in FIG. 1) and sends energy usage information to the EC system 400. The EC system 400 processes the energy usage information and generates one or more energy delivery parameters $C_{ED}$, which it sends to the ER system 500 via communication link 430. The ER system 500 receives the one or more energy delivery parameters $C_{ED}$ and adjusts the electrical power $E_{Supply}(t)$ supplied to the users 150, 160 based on the received energy delivery parameters $C_{ED}$. The EVP system 600 receives the weather data and the energy usage data and calculates the energy usage improvement from the VCC 200.

The VCC system 200 minimizes power system losses, reduces user energy consumption and provides precise user voltage control. The VCC system 200 may include a closed loop process control application that uses user voltage data provided by the ED system 300 to control, for example, a voltage set point $V_{SP}$ on a distribution circuit (not shown) within the ER system 500. That is, the VCC system 200 may control the voltages $V_{Supply}(t)$ of the electrical power $E_{Supply}(t)$ supplied to the users 150, 160, by adjusting the voltage set point $V_{SP}$ of the distribution circuit in the ER system 500, which may include, for example, one or more load tap changing (LTC) transformers, one or more voltage regulators, or other voltage controlling equipment to maintain a tighter band for optimization of the operation of the voltages $V_{Delivered}(t)$ of the electric power $E_{Delivered}(t)$ delivered to the users 150, 160, to lower power losses and facilitate efficient use of electrical power $E_{Delivered}(t)$ at the user locations 150 or 160.

The VCC system 200 optimally controls or adjusts the voltage $V_{Supply}(t)$ of the electrical power $E_{Supply}(t)$ supplied from the EC system 500 based on AMI data, which includes measured voltage $V_{Meter}(t)$ data from the users 150, 160 in the ED system 300, and based on validation data from the EVP system 600 and information received from the EPP system 1700. The VCC system 200 may adjust the voltage set point $V_{SP}$ at the substation or line regulator level in the ER system 500 by, for example, adjusting the LTC transformer (not shown), circuit regulators (not shown), or the like, to maintain the user voltages $V_{Meter}$ (t) in a target voltage band $V_{Band-n}$, which may include a safe nominal operating range.

The VCC system 200 is configured to maintain the electrical power $E_{Delivered}(t)$ delivered to the users 150, 160 within one or more voltage bands $V_{Band-n}$. For example, the energy may be delivered in two or more voltage bands $V_{Band-n}$ substantially simultaneously, where the two or more voltage bands may be substantially the same or different. The value $V_{Band-n}$ may be determined by the following expression [1]:

$$V_{Band-n}=V_{SP}+\Delta V \quad [1]$$

where $V_{Band-n}$ is a range of voltages, n is a positive integer greater than zero corresponding to the number of voltage bands $V_{Band}$ that may be handled at substantially the same time, $V_{SP}$ is the voltage set point value and $\Delta V$ is a voltage deviation range.

For example, the VCC system 200 may maintain the electrical power $E_{Delivered}(t)$ delivered to the users 150, 160 within a band $V_{Band-1}$ equal to, for example, 111V to 129V for rural applications, where $V_{SP}$ is set to 120V and $\Delta V$ is set to a deviation of seven-and-one-half percent (+/−7.5%). Similarly, the VCC system 200 may maintain the electrical power $E_{Delivered}(t)$ delivered to the users 150, 160 within a band $V_{Band-2}$ equal to, for example, 114V to 126V for urban applications, where $V_{SP}$ is set to 120V and $\Delta V$ is set to a deviation of five (+/−5%).

The VCC system 200 may maintain the electrical power $E_{Delivered}(t)$ delivered to the users 150, 160 at any voltage band $V_{Band-n}$ usable by the users 150, 160, by determining appropriate values for $V_{SP}$ and $\Delta V$. In this regard, the values $V_{SP}$ and $\Delta V$ may be determined by the EC system 400 based on the energy usage information for users 150, 160, received from the ED system 300.

The EC system 400 may send the $V_{SP}$ and $\Delta V$ values to the ER system 500 as energy delivery parameters $C_{ED}$, which may also include the value $V_{Band-n}$. The ER system 500 may then control and maintain the voltage $V_{Delivered}(t)$ of the electrical power $E_{Delivered}(t)$ delivered to the users 150, 160, within the voltage band $V_{Band-n}$. The energy delivery parameters $C_{ED}$ may further include, for example, load-tap-changer (LTC) control commands.

The EVP system 600 may further measure and validate energy savings by comparing energy usage by the users 150, 160 before a change in the voltage set point value $V_{SP}$ (or voltage band $V_{Band-n}$) to the energy usage by the users 150, 160 after a change in the voltage set point value $V_{SP}$ (or voltage band $V_{Band-n}$), according to principles of the disclosure. These measurements and validations may be used to determine the effect in overall energy savings by, for example, lowering the voltage $V_{Delivered}(t)$ of the electrical power $E_{Delivered}(t)$ delivered to the users 150, 160, and to determine optimal delivery voltage bands $V_{Band-n}$ for the energy power $E_{Delivered}(t)$, delivered to the users 150, 160.

ER System 500

The ER system 500 may communicate with the ED system 300 and/or EC system 400 by means of the network 170. The ER system 500 is coupled to the network 170 and the EC system 400 by means of communication links 510 and 430, respectively. The EC system 500 is also coupled to the ED system 300 by means of the power lines 340, which may include communication links.

The ER system 500 includes a substation 530 which receives the electrical power supply $E_{In}(t)$ from, for example, the power generating station 110 (shown in FIG. 1) on a line 520. The electrical power $E_{In}(t)$ includes a voltage $V_{In}(t)$ component and a current $I_{In}(t)$ component. The substation 530 adjustably transforms the received electrical power $E_{In}(t)$ to, for example, reduce (or step-down) the voltage component $V_{In}(t)$ of the electrical power $E_{In}(t)$ to a voltage value $V_{Supply}(t)$ of the electrical power $E_{Supply}(t)$ supplied to the plurality of AMIs 330 on the power supply lines 340.

The substation 530 may include a transformer (not shown), such as, for example, a load tap change (LTC) transformer. In this regard, the substation 530 may further include an automatic tap changer mechanism (not shown), which is configured to automatically change the taps on the LTC transformer. The tap changer mechanism may change the taps on the LTC transformer either on-load (on-load tap changer, or OLTC) or off-load, or both. The tap changer mechanism may be motor driven and computer controlled. The substation 530 may also include a buck/boost transformer to adjust and maximize the power factor of the electrical power $E_{Delivered}(t)$ supplied to the users on power supply lines 340.

Additionally (or alternatively), the substation 530 may include one or more voltage regulators, or other voltage controlling equipment, as known by those having ordinary skill in the art, that may be controlled to maintain the output the voltage component $V_{Supply}(t)$ of the electrical power $E_{Supply}(t)$ at a predetermined voltage value or within a predetermined range of voltage values.

The substation 530 receives the energy delivery parameters $C_{ED}$ from the EC system 400 on the communication link 430. The energy delivery parameters $C_{ED}$ may include, for example, load tap coefficients when an LTC transformer is used to step-down the input voltage component $V_{In}(t)$ of the electrical power $E_{In}(t)$ to the voltage component $V_{Supply}(t)$ of the electrical power $E_{Supply}(t)$ supplied to the ED system 300. In this regard, the load tap coefficients may be used by the ER system 500 to keep the voltage component $V_{supply}(t)$ on the low-voltage side of the LTC transformer at a predetermined voltage value or within a predetermined range of voltage values.

The LTC transformer may include, for example, seventeen or more steps (thirty-five or more available positions), each of which may be selected based on the received load tap coefficients. Each change in step may adjust the voltage component $V_{Supply}(t)$ on the low voltage side of the LTC transformer by as little as, for example, about five-sixteenths (0.3%), or less.

Alternatively, the LTC transformer may include fewer than seventeen steps. Similarly, each change in step of the LTC transformer may adjust the voltage component $V_{Supply}(t)$ on the low voltage side of the LTC transformer by more than, for example, about five-sixteenths (0.3%).

The voltage component $V_{Supply}(t)$ may be measured and monitored on the low voltage side of the LTC transformer by, for example, sampling or continuously measuring the voltage component $V_{Supply}(t)$ of the stepped-down electrical power $E_{Supply}(t)$ and storing the measured voltage component $V_{Supply}(t)$ values as a function of time t in a storage (not shown), such as, for example, a computer readable medium. The voltage component $V_{Supply}(t)$ may be monitored on, for example, a substation distribution bus, or the like. Further, the voltage component $V_{Supply}(t)$ may be measured at any point where measurements could be made for the transmission or distribution systems in the ER system 500.

Similarly, the voltage component $V_{In}(t)$ of the electrical power $E_{In}(t)$ input to the high voltage side of the LTC transformer may be measured and monitored. Further, the current component $I_{Supply}(t)$ of the stepped-down electrical power $E_{Supply}(t)$ and the current component $I_{In}(t)$ of the electrical power Eat) may also be measured and monitored. In this regard, a phase difference $\phi_{In}(t)$ between the voltage $V_{In}(t)$ and current $I_{In}(t)$ components of the electrical power $E_{In}(t)$ may be determined and monitored. Similarly, a phase difference $\phi_{Supply}(t)$ between the voltage $V_{Supply}(t)$ and current $I_{Supply}(t)$ components of the electrical energy supply $E_{Supply}(t)$ may be determined and monitored.

The ER system 500 may provide electrical energy supply status information to the EC system 400 on the communication links 430 or 510. The electrical energy supply information may include the monitored voltage component $V_{Supply}(t)$. The electrical energy supply information may further include the voltage component Vat), current components $T_{In}(t)$, $I_{Supply}(t)$, and/or phase difference values $\phi_{In}(t)$, $\phi_{Supply}(t)$, as a function of time t. The electrical energy supply status information may also include, for example, the load rating of the LTC transformer.

The electrical energy supply status information may be provided to the EC system 400 at periodic intervals of time, such as, for example, every second, 5 sec., 10 sec., 30 sec., 60 sec., 120 sec., 600 sec., or any other value within the scope and spirit of the disclosure, as determined by one having ordinary skill in the art. The periodic intervals of time may be set by the EC system 400 or the ER system 500. Alternatively, the electrical energy supply status information may be provided to the EC system 400 or ER system 500 intermittently.

Further, the electrical energy supply status information may be forwarded to the EC system 400 in response to a request by the EC system 400, or when a predetermined event is detected. The predetermined event may include, for example, when the voltage component $V_{Supply}(t)$ changes by an amount greater (or less) than a defined threshold value $V_{SupplyThreshold}$ (for example, 130V) over a predetermined interval of time, a temperature of one or more components in the ER system 500 exceeds a defined temperature threshold, or the like.

ED System 300

The ED system 300 includes a plurality of AMIs 330. The ED system 300 may further include at least one collector 350, which is optional. The ED system 300 may be coupled to the network 170 by means of a communication link 310. The collector 350 may be coupled to the plurality of AMIs 330 by means of a communication link 320. The AMIs 330 may be coupled to the ER system 500 by means of one or more power supply lines 340, which may also include communication links.

Each AMI 330 is configured to measure, store and report energy usage data by the associated users 150, 160 (shown in FIG. 1). Each AMI 330 is further configured to measure and determine energy usage at the users 150, 160, including the voltage component $V_{Meter}(t)$ and current component $I_{Meter}(t)$ of the electrical power $E_{Meter}(t)$ used by the users 150, 160, as a function of time. The AMIs 330 may measure the voltage component $V_{Meter}(t)$ and current component $I_{Meter}(t)$ of the electrical power $E_{Meter}(t)$ at discrete times $t_s$, where s is a sampling period, such as, for example, s=5 sec., 10 sec., 30 sec., 60 sec., 300 sec., 600 sec., or more. For example, the AMIs 330 may measure energy usage every, for example, minute ($t_{60\ sec}$), five minutes ($t_{300\ sec}$), ten minutes ($t_{600\ sec}$), or more, or at time intervals variably set by the AMI 330 (for example, using a random number generator).

The AMIs 330 may average the measured voltage $V_{Meter}(t)$ and/or $I_{Meter}(t)$ values over predetermined time intervals (for example, 5 min., 10 min., 30 min., or more). The AMIs 330 may store the measured electrical power usage $E_{Meter}(t)$, including the measured voltage component $V_{Meter}(t)$ and/or current component $I_{Meter}(t)$ as AMI data in a local (or remote) storage (not shown), such as, for example, a computer readable medium.

Each AMI 330 is also capable of operating in a "report-by-exception" mode for any voltage $V_{Meter}(t)$, current $I_{Meter}(t)$, or energy usage $E_{Meter}(t)$ that falls outside of a target component band. The target component band may include, a target voltage band, a target current band, or a target energy usage band. In the "report-by-exception" mode, the AMI 330 may sua sponte initiate communication and send AMI data to the EC system 400. The "report-by-exception" mode may be used to reconfigure the AMIs 330 used to represent, for example, the lowest voltages on the circuit as required by changing system conditions.

The AMI data may be periodically provided to the collector 350 by means of the communication links 320. Additionally, the AMIs 330 may provide the AMI data in response to a AMI data request signal received from the collector 350 on the communication links 320.

Alternatively (or additionally), the AMI data may be periodically provided directly to the EC system 400 (for example, the MAS 460) from the plurality of AMIs, by means of, for example, communication links 320, 410 and network 170. In this regard, the collector 350 may be bypassed, or eliminated from the ED system 300. Furthermore, the AMIs 330 may provide the AMI data directly to the EC system 400 in response to a AMI data request signal received from the EC system 400. In the absence of the collector 350, the EC system (for example, the MAS 460) may carry out the functionality of the collector 350 described herein.

The request signal may include, for example, a query (or read) signal and a AMI identification signal that identifies the particular AMI 330 from which AMI data is sought. The AMI data may include the following information for each AMI 330, including, for example, kilo-Watt-hours (kWh) delivered data, kWh received data, kWh delivered plus kWh received data, kWh delivered minus kWh received data, voltage level data, current level data, phase angle between voltage and current, kVar data, time interval data, demand data, and the like.

Additionally, the AMIs 330 may send the AMI data to the meter automation system server MAS 460. The AMI data may be sent to the MAS 460 periodically according to a predetermined schedule or upon request from the MAS 460.

The collector 350 is configured to receive the AMI data from each of the plurality of AMIs 330 via the communication links 320. The collector 350 stores the received AMI data in a local storage (not shown), such as, for example, a computer readable medium (e.g., a non-transitory computer readable medium). The collector 350 compiles the received AMI data into a collector data. In this regard, the received AMI data may be aggregated into the collector data based on, for example, a geographic zone in which the AMIs 330 are located, a particular time band (or range) during which the AMI data was collected, a subset of AMIs 330 identified in a collector control signal, and the like. In compiling the received AMI data, the collector 350 may average the voltage component $V_{Meter}(t)$ values received in the AMI data from all (or a subset of all) of the AMIs 330.

The EC system 400 is able to select or alter a subset of all of the AMIs 330 to be monitored for predetermined time intervals, which may include for example 15 minute intervals. It is noted that the predetermined time intervals may be shorter or longer than 15 minutes. The subset of all of the AMIs 330 is selectable and can be altered by the EC system 400 as needed to maintain minimum level control of the voltage $V_{Supply}(t)$ supplied to the AMIs 330.

The collector 350 may also average the electrical power $E_{Meter}(t)$ values received in the AMI data from all (or a subset of all) of the AMIs 330. The compiled collector data may be provided by the collector 350 to the EC system 400 by means of the communication link 310 and network 170. For example, the collector 350 may send the compiled collector data to the MAS 460 (or ROC 490) in the EC system 400.

The collector 350 is configured to receive collector control signals over the network 170 and communication link 310 from the EC system 400. Based on the received collector control signals, the collector 350 is further configured to select particular ones of the plurality of AMIs 330 and query the meters for AMI data by sending a AMI data request signal to the selected AMIs 330. The collector 350 may then collect the AMI data that it receives from the selected AMIs 330 in response to the queries. The selectable AMIs 330 may include any one or more of the plurality of AMIs 330. The collector control signals may include, for example, an identification of the AMIs 330 to be queried (or read), time(s) at which the identified AMIs 330 are to measure the $V_{Meter}(t)$ $I_{Meter}(t)$, $E_{Meter}(t)$ and/or $\phi_{Meter}(t)$ ($\phi_{Meter}(t)$ is the phase difference between the voltage $V_{Meter}(t)$ and current $I_{Meter}(t)$ components of the electrical power $E_{Meter}(t)$ measured at the identified AMI 330), energy usage information since the last reading from the identified AMI 330, and the like. The collector 350 may then compile and send the compiled collector data to the MAS 460 (and/or ROC 490) in the EC system 400.

EC System 400

The EC system 400 may communicate with the ED system 300 and/or ER system 500 by means of the network 170. The EC system 400 is coupled to the network 170 by means of one or more communication links 410. The EC system 400 may also communicate directly with the ER system 500 by means of a communication link 430.

The EC system 400 includes the MAS 460, a database (DB) 470, a distribution management system (DMS) 480, and a regional operation center (ROC) 490. The ROC 490 may include a computer (ROC computer) 495, a server (not shown) and a database (not shown). The MAS 460 may be coupled to the DB 470 and DMS 480 by means of communication links 420 and 440, respectively. The DMS 480 may be coupled to the ROC 490 and ER system 500 by means of the communication link 430. The database 470 may be located at the same location as (for example, proximate to, or within) the MAS 460, or at a remote location that may be accessible via, for example, the network 170.

The EC system 400 is configured to de-select, from the subset of monitored AMIs 330, a AMI 330 that the EC system 400 previously selected to monitor, and select the AMI 330 that is outside of the subset of monitored AMIs 330, but which is operating in the report-by-exception mode. The EC system 400 may carry out this change after receiving the sua sponte AMI data from the non-selected AMI 330. In this regard, the EC system 400 may remove or terminate a connection to the de-selected AMI 330 and create a new connection to the newly selected AMI 330 operating in the report-by-exception mode. The EC system 400 is further configured to select any one or more of the plurality of AMIs 330 from which it receives AMI data comprising, for example, the lowest measured voltage component $V_{Meter}(t)$ and generate an energy delivery parameter $C_{ED}$ based on the AMI data received from the AMI(s) 330 that provide the lowest measured voltage component $V_{Meter}(t)$.

The MAS 460 may include a computer (not shown) that is configured to receive the collector data from the collector 350, which includes AMI data collected from a selected subset (or all) of the AMIs 330. The MAS 460 is further configured to retrieve and forward AMI data to the ROC 490 in response to queries received from the ROC 490. The MAS 460 may store the collector data, including AMI data in a local storage and/or in the DB 470.

The DMS 480 may include a computer that is configured to receive the electrical energy supply status information from the substation 530. The DMS 480 is further configured to retrieve and forward measured voltage component $V_{Meter}(t)$ values and electrical power $E_{Meter}(t)$ values in response to queries received from the ROC 490. The DMS 480 may be further configured to retrieve and forward measured current component $I_{Meter}(t)$ values in response to queries received from the ROC 490. The DMS 480 also may be further configured to retrieve all "report-by-exception" voltages $V_{Meter}(t)$ from the AMIs 330 operating in the "report-by-exception" mode and designate the voltages $V_{Meter}(t)$ (t) as one of the control points to be continuously read at predetermined times (for example, every 15 minutes, or less (or more), or at varying times). The "report-by-exception voltages $V_{Meter}(t)$ (t) may be used to control the EC 500 set points.

The DB 470 may include a plurality of relational databases (not shown). The DB 470 includes a large number of records that include historical data for each AMI 330, each collector 350, each substation 530, and the geographic area(s) (including latitude, longitude, and altitude) where the AMIs 330, collectors 350, and substations 530 are located.

For instance, the DB 470 may include any one or more of the following information for each AMI 330, including: a geographic location (including latitude, longitude, and altitude); a AMI identification number; an account number; an account name; a billing address; a telephone number; a AMI type, including model and serial number; a date when the AMI was first placed into use; a time stamp of when the AMI was last read (or queried); the AMI data received at the time of the last reading; a schedule of when the AMI is to be read (or queried), including the types of information that are to be read; and the like.

The historical AMI data may include, for example, the electrical power $E_{Meter}(t)$ used by the particular AMI 330, as a function of time. Time t may be measured in, for example, discrete intervals at which the electrical power $E_{Meter}$ magnitude (kWh) of the received electrical power $E_{Meter}(t)$ is measured or determined at the AMI 330. The historical AMI data includes a measured voltage component $V_{Meter}(t)$ of the electrical energy $E_{Meter}(t)$ received at the AMI 330. The historical AMI data may further include a measured current component $I_{Meter}(t)$ and/or phase difference $\phi_{Meter}(t)$ of the electrical power $E_{Meter}(t)$ received at the AMI 330.

As noted earlier, the voltage component $V_{Meter}(t)$ may be measured at a sampling period of, for example, every five seconds, ten seconds, thirty seconds, one minute, five minutes, ten minutes, fifteen minutes, or the like. The current component $I_{Meter}(t)$ and/or the received electrical power $E_{Meter}(t)$ values may also be measured at substantially the same times as the voltage component $V_{Meter}(t)$.

Given the low cost of memory, the DB 470 may include historical data from the very beginning of when the AMI data was first collected from the AMIs 330 through to the most recent AMI data received from the AMIs 330.

The DB 470 may include a time value associated with each measured voltage component $V_{Meter}(t)$ current component $I_{Meter}(t)$ phase component $\phi_{Meter}(t)$ and/or electrical power $E_{Meter}(t)$ which may include a timestamp value generated a at the AMI 330. The timestamp value may include, for example, a year, a month, a day, an hour, a minute, a second, and a fraction of a second. Alternatively, the timestamp may be a coded value which may be decoded to determine a year, a month, a day, an hour, a minute, a second, and a fraction of a second, using, for example, a look up table. The ROC 490 and/or AMIs 330 may be configured to receive, for example, a WWVB atomic clock signal transmitted by the U.S. National Institute of Standards and Technology (NIST), or the like and synchronize its internal clock (not shown) to the WWVB atomic clock signal.

The historical data in the DB 470 may further include historical collector data associated with each collector 350. The historical collector data may include any one or more of the following information, including, for example: the particular AMIs 330 associated with each collector 350; the geographic location (including latitude, longitude, and altitude) of each collector 350; a collector type, including model and serial number; a date when the collector 350 was first placed into use; a time stamp of when collector data was last received from the collector 350; the collector data that was received; a schedule of when the collector 350 is expected to send collector data, including the types of information that are to be sent; and the like.

The historical collector data may further include, for example, an external temperature value $T_{Collector}(t)$ measured outside of each collector 350 at time t. The historical collector data may further include, for example, any one or more of the following for each collector 350: an atmospheric pressure value $P_{Collector}(t)$ measured proximate the collector 350 at time t; a humidity value $H_{Collector}(t)$ measured proximate the collector 350 at time t; a wind vector value $W_{Collector}(t)$ measured proximate the collector 350 at time t, including direction and magnitude of the measured wind; a solar irradiant value $L_{Collector}(t)$ (kW/m$^2$) measured proximate the collector 350 at time t; and the like.

The historical data in the DB 470 may further include historical substation data associated with each substation 530. The historical substation data may include any one or more of the following information, including, for example: the identifications of the particular AMIs 330 supplied with electrical energy $E_{Supply}(t)$ by the substation 530; the geographic location (including latitude, longitude, and altitude) of the substation 530; the number of distribution circuits; the number of transformers; a transformer type of each transformer, including model, serial number and maximum Megavolt Ampere (MVA) rating; the number of voltage regulators; a voltage regulator type of each voltage regulator, including model and serial number; a time stamp of when substation data was last received from the substation 530; the substation data that was received; a schedule of when the substation 530 is expected to provide electrical energy supply status information, including the types of information that are to be provided; and the like.

The historical substation data may include, for example, the electrical power $E_{Supply}(t)$ supplied to each particular AMI 330, where $E_{Supply}(t)$ is measured or determined at the output of the substation 530. The historical substation data includes a measured voltage component $V_{Supply}(t)$ of the supplied electrical power $E_{Supply}(t)$, which may be measured, for example, on the distribution bus (not shown) from the transformer. The historical substation data may further include a measured current component $I_{Supply}(t)$ of the supplied electrical power $E_{Supply}(t)$. As noted earlier, the voltage component $V_{Supply}(t)$, the current component $I_{Supply}(t)$, and/or the electrical power $E_{Supply}(t)$ may be measured at a sampling period of, for example, every five seconds, ten seconds, thirty seconds, a minute, five minutes, ten minutes, or the like. The historical substation data may further include a phase difference value $\phi_{Supply}(t)$ between the voltage $V_{Supply}(t)$ and current $I_{Supply}(t)$ signals of the electrical power $E_{Supply}(t)$, which may be used to determine the power factor of the electrical power $E_{Supply}(t)$ supplied to the AMIs 330.

The historical substation data may further include, for example, the electrical power $E_{In}(t)$ received on the line 520 at the input of the substation 530, where the electrical power $E_{In}(t)$ is measured or determined at the input of the substation 530. The historical substation data may include a measured voltage component $V_{In}(t)$ of the received electrical power $E_{In}(t)$, which may be measured, for example, at the input of the transformer. The historical substation data may further include a measured current component $I_{In}(t)$ of the received electrical power $E_{In}(t)$. As noted earlier, the voltage component $V_{In}(t)$, the current component $I_{In}(t)$, and/or the electrical power $E_{In}(t)$ may be measured at a sampling period of, for example, every five seconds, ten seconds, thirty seconds, a minute, five minutes, ten minutes, or the like. The historical substation data may further include a phase difference $\phi_{In}(t)$ between the voltage component $V_{In}(t)$ and current component $I_{In}(t)$ of the electrical power $E_{In}(t)$. The power factor of the electrical power $E_{In}(t)$ may be determined based on the phase difference $\phi_{In}(t)$.

According to an aspect of the disclosure, the EC system 400 may save aggregated kW data at the substation level, voltage data at the substation level, and weather data to compare to energy usage per AMI 330 to determine the energy savings from the VCC system 200, and using linear regression to remove the effects of weather, load growth, economic effects, and the like, from the calculation.

In the VCC system 200, control may be initiated from, for example, the ROC computer 495. In this regard, a control screen 305 may be displayed on the ROC computer 495, as shown, for example, in FIG. 3 of the US 2013/0030591 publication. The control screen 305 may correspond to data for a particular substation 530 (for example, the TRABUE SUBSTATION) in the ER system 500. The ROC computer 495 can control and override (if necessary), for example, the substation 530 load tap changing transformer based on, for example, the AMI data received from the ED system 300 for the users 150, 160. The ED system 300 may determine the voltages of the electrical power supplied to the user locations 150, 160, at predetermined (or variable) intervals, such as, e.g., on average each 15 minutes, while maintaining the voltages within required voltage limits.

For system security, the substation 530 may be controlled through the direct communication link 430 from the ROC 490 and/or DMS 480, including transmission of data through communication link 430 to and from the ER 500, EUS 300 and EVP 600.

Furthermore, an operator can initiate a voltage control program on the ROC computer 490, overriding the controls, if necessary, and monitoring a time it takes to read the user voltages $V_{Meter}(t)$ being used for control of, for example, the substation LTC transformer (not shown) in the ER system 500.

EVP System 600

FIG. 2 of the co-pending/P006 application shows the energy validation process 600 for determining the amount of conservation in energy per customer realized by operating the VCC system in FIGS. 1-2 of the present application. The process is started 601 and the data the ON and OFF periods is loaded 602 by the process manager. The next step is to collect 603 the hourly voltage and power (MW) data from the metering data points on the VCC system from the DMS 480 which may be part of a supervisory control and data acquisition (SCADA) type of industrial control system. Next the corresponding weather data is collected 604 for the same hourly conditions. The data is processed 605, 606, 607, 608 to improve its quality using filters and analysis techniques to eliminate outliers that could incorrectly affect the results, as describe further below. If hourly pairing is to be done the hourly groups are determined 609 using the linear regression techniques. The next major step is to determine 611, 612, 613, 614, 615, 616, 617 the optimal pairing of the samples, as described further below.

EPP System 1700

FIG. 2 of the present application also shows an example of the EPP system 1700 applied to a distribution circuit, that also may include the VCC system 200 and the EVP system 600, as discussed previously. The EPP system 1700 collects the historic energy and voltage data from the AMI system from database 470 and/or the distribution management systems (DMS) 480 and combines this with the CVR factor analysis from the EVP system 600 (discussed in detail in the co-pending/P006 application) to produce an optimized robust planning process for correcting problems and improving the capability of the VCC system 200 to increase the energy efficiency and demand reduction applications.

Figure 3:
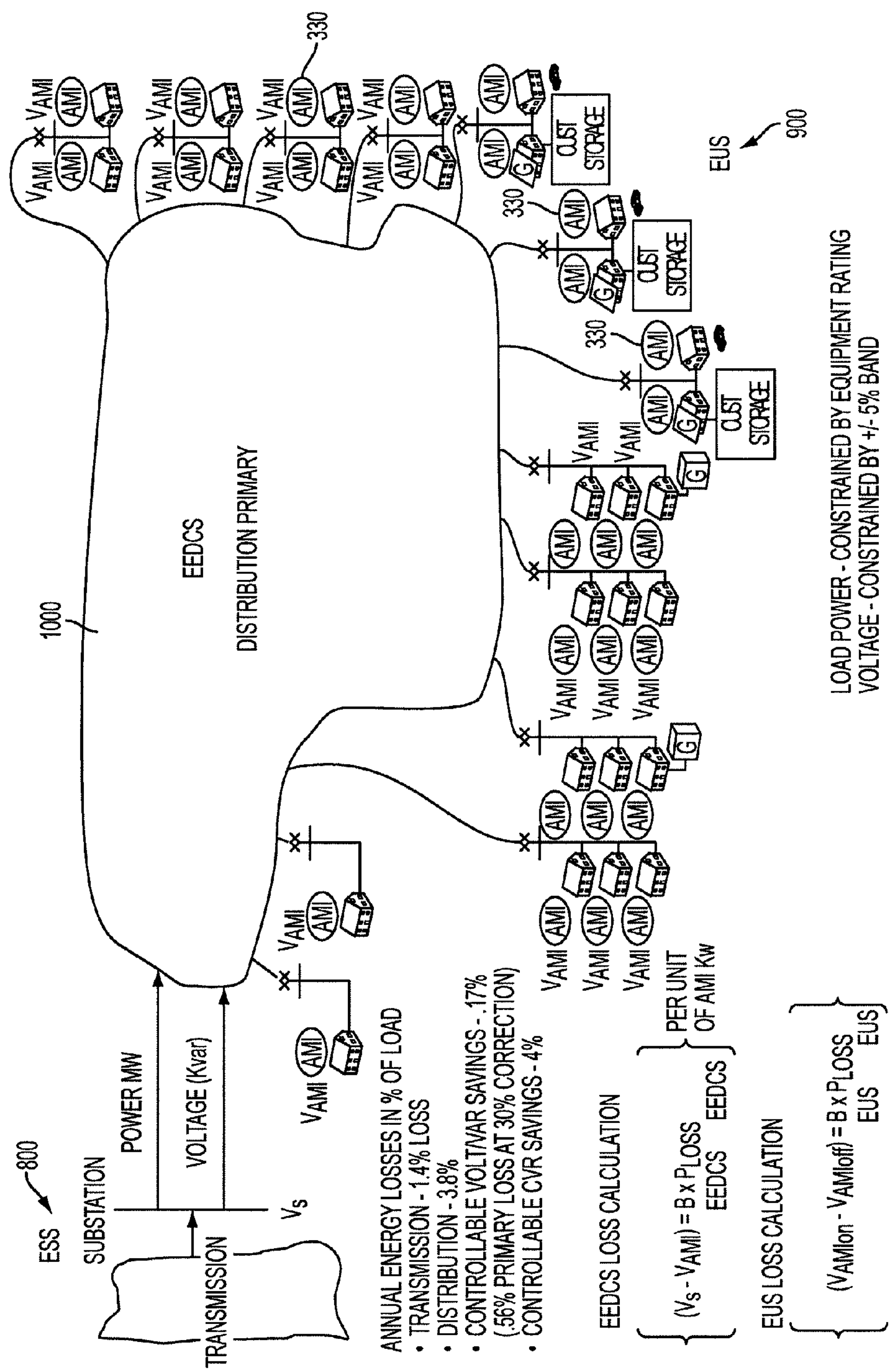
FIG. 3 shows an example of how the EEDCS is represented as a linear model for the calculation of the delivery voltages and the energy losses by just using a linear model with assumptions within the limitations of the output voltages, according to principles of the disclosure.

FIG. 3 shows an example of how the EEDCS 1000 is represented as a linear model for the calculation of the delivery voltages and the energy losses by just using a linear model with assumptions within the limitations of the output voltages. This model enables a robust model that can implement an optimization process and is more accommodating to a secondary voltage measuring system (e.g., AMI-based measurements). The two linear approximations for the power losses associated with the voltage drops from the ESS 800 to the EUS 900 are shown and make up the mathematical model for the performance criterion over limited model range of the voltage constraints of the EUS AMI voltages. The energy losses in the EEDCS 1000 can be linearized based on the voltage drop from the ESS 800 to the EUS 900, as represented by the equation: $V_S - V_{AMI} = B_{EEDCS} \times P_{LossEEDCS}$, where $V_S$ is the ESS voltage, $V_{AMI}$ is the EUS voltage (as measured by AMI 330), $B_{EEDCS}$ represents the slope of the linear regression, and $P_{LossEEDCS}$ represents the loss energy losses in the EEDCS 1000. Similarly, the energy loss in an EUS 900 (e.g., the difference in energy between when the load is in the ON and OFF states) can be linearized based on the voltage difference between a measurement in the load-ON state and a measurement in the load-OFF state, as represented by the equation: $V_{ANIon} - V_{AMIoff} = B_{EUS} \times P_{LossEUS}$, where $V_{AMIon}$ is the EUS voltage in the ON state, $V_{AMIoff}$ is the EUS voltage in the OFF state, $B_{EUS}$ represents the slope of the linear regression, and $P_{LossEUS}$ represents the difference in energy between the load-ON and load-OFF states. The relative loss amounts between the primary and secondary EEDCS ($P_{LossEEDCS}$) to the CVR factor-based losses of the EUS to ED ($P_{LossEUS}$) are less than 5% and more than 95%. This near order of magnitude difference allows more assumptions to be used in deriving the smaller magnitude of the EEDCS losses and the more accurate model for calculating the larger CVR factor losses of the EUS to ED.

Figure 4:
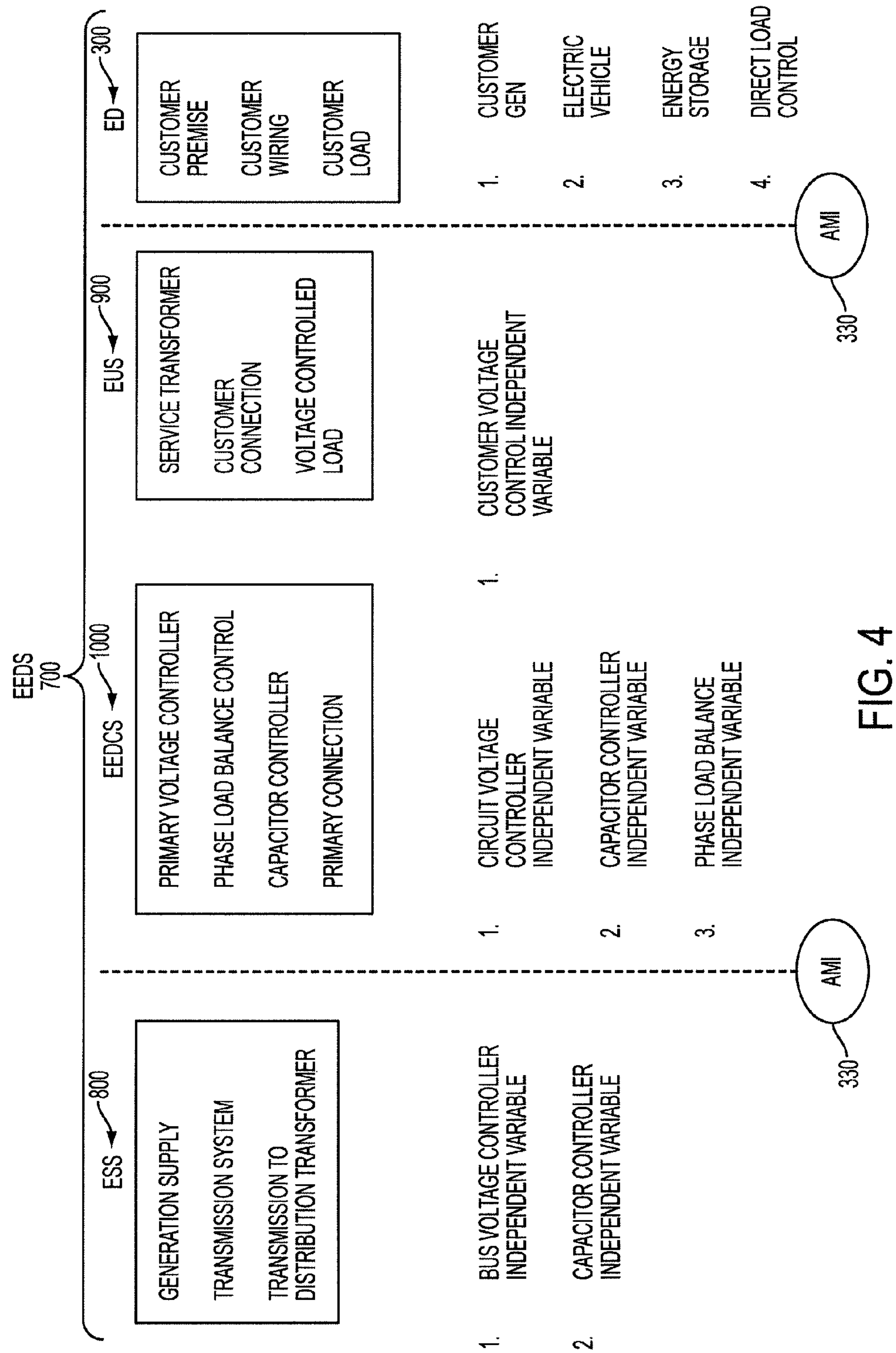
FIG. 4 shows an example of a EEDS structure for an electric distribution system with measuring points at the ESS delivery points and the EUS metering points, showing the equipment and devices within the system and the independent variables that can be used to accomplish the optimization of the EEDS, according to principles of the disclosure.

FIG. 4 shows an example of an EEDS control structure for an electric distribution system with measuring points at the ESS delivery points and the EUS metering points. The control points are the independent variables in the optimization model that will be used to determine the optimum solution to the minimization of the power losses in the EEDS 700. The blocks at the top of the FIG. 4 illustrate the components of the various systems of the EEDS. 700, e.g., ESS 800, EEDCS 1000, EUS 900 and ED system 300, where the controls or independent variables are located. Below each box include examples of the independent variables that can be used to accomplish the optimization of the EEDS 700. For example, the independent variables to be used in the optimization may include the LTC transformer output voltages, the regulator output voltages, the position of the capacitor banks, the voltage level of the distributed generation, customer voltage control devices, the inverters for electrical vehicle charging, direct load control devices that affect voltage. The AMI meters 330 are placed at points where the independent variables and the output voltages to the EUS 900 can be measured by the VCC 200.

Figure 5:
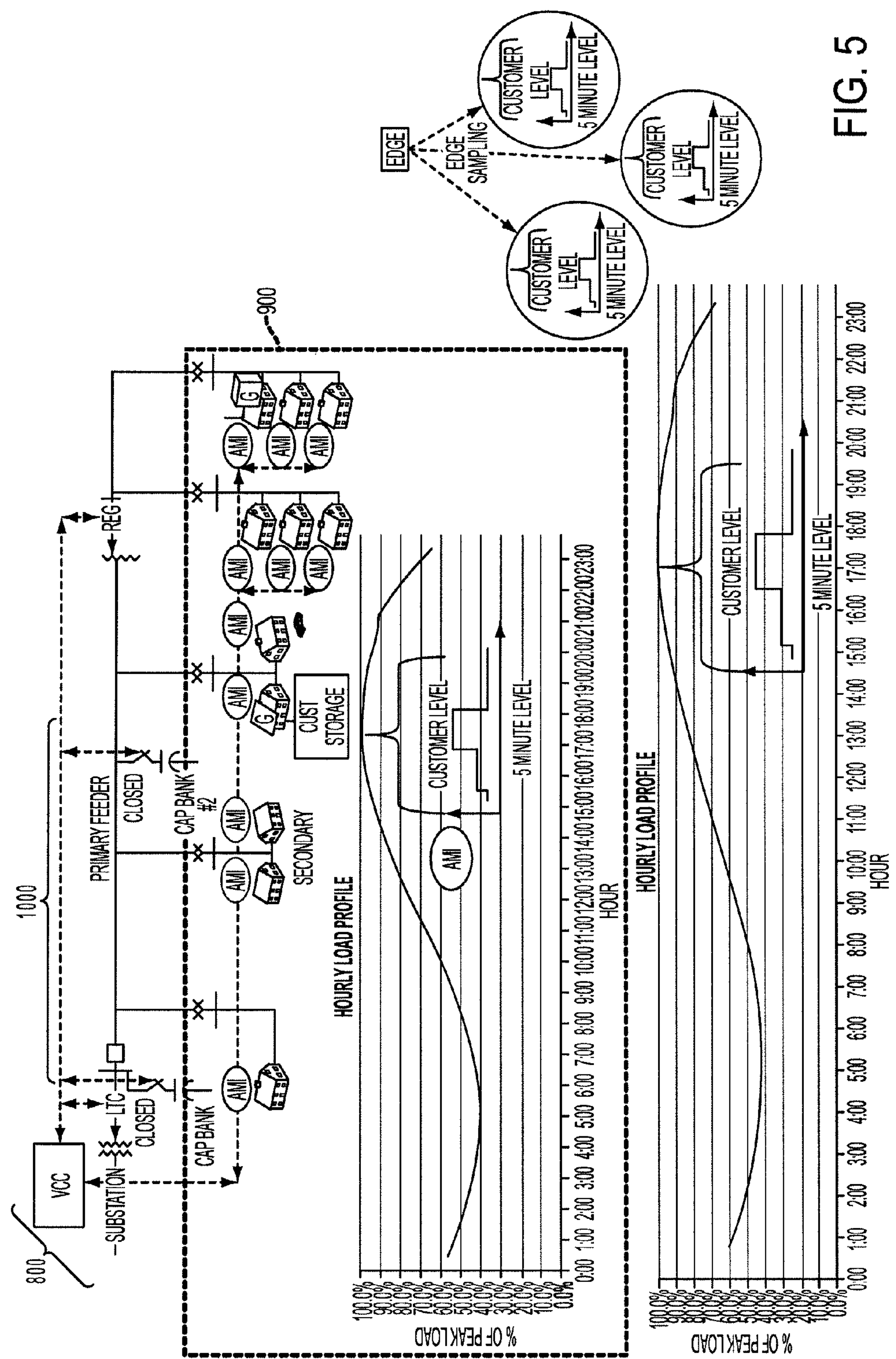
FIG. 5 shows an example of the measuring system for the AMI meters used in the VCC, according to principles of the disclosure.

FIG. 5 shows an example of the measuring system for the AMI meters 330 used in the VCC 200. The key characteristic is that the meters 330 sample the constantly changing levels of voltage at the EUS 900 delivery points and produce the data points that can be compared to the linear model of the load characteristics. This process is used to provide the 5-15 minute sampling that provides the basis to search the boundary conditions of the EEDS 700 to locate the optimum point (discussed in more detail below with reference to FIGS. 9-13). The independent variables are measured to determine the inputs to the linear model for producing an expected state of the output voltages to the EUS 900 for use in modeling the optimization and determining the solution to the optimization problem.

Figure 6:
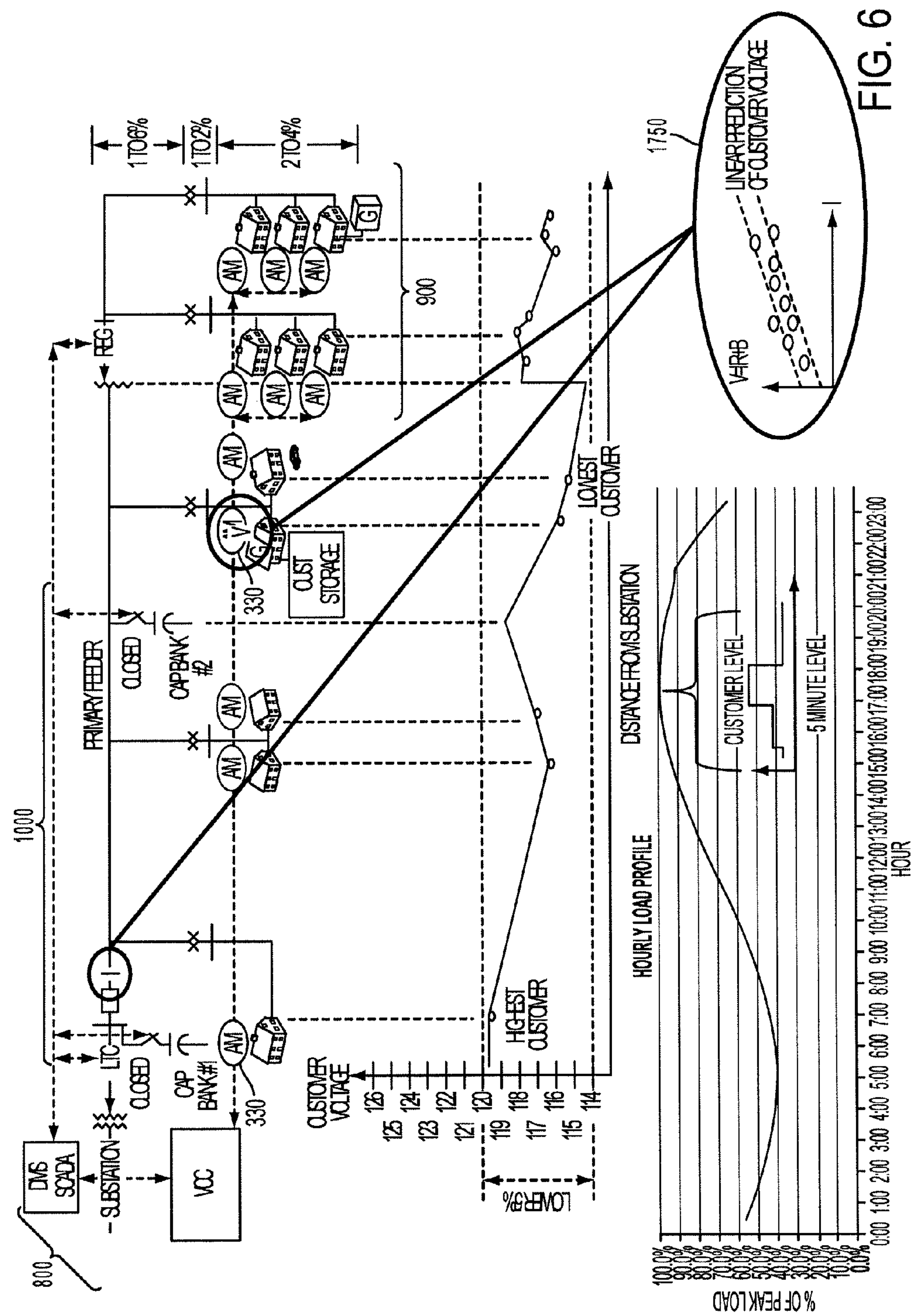
FIG. 6 shows an example of the linear regression analysis relating the control variables to the EUS voltages that determine the power loss, voltage level and provide the input for searching for the optimum condition and recognizing the abnormal voltage levels from the AMI voltage metering, according to principles of the disclosure.
Figure 7:
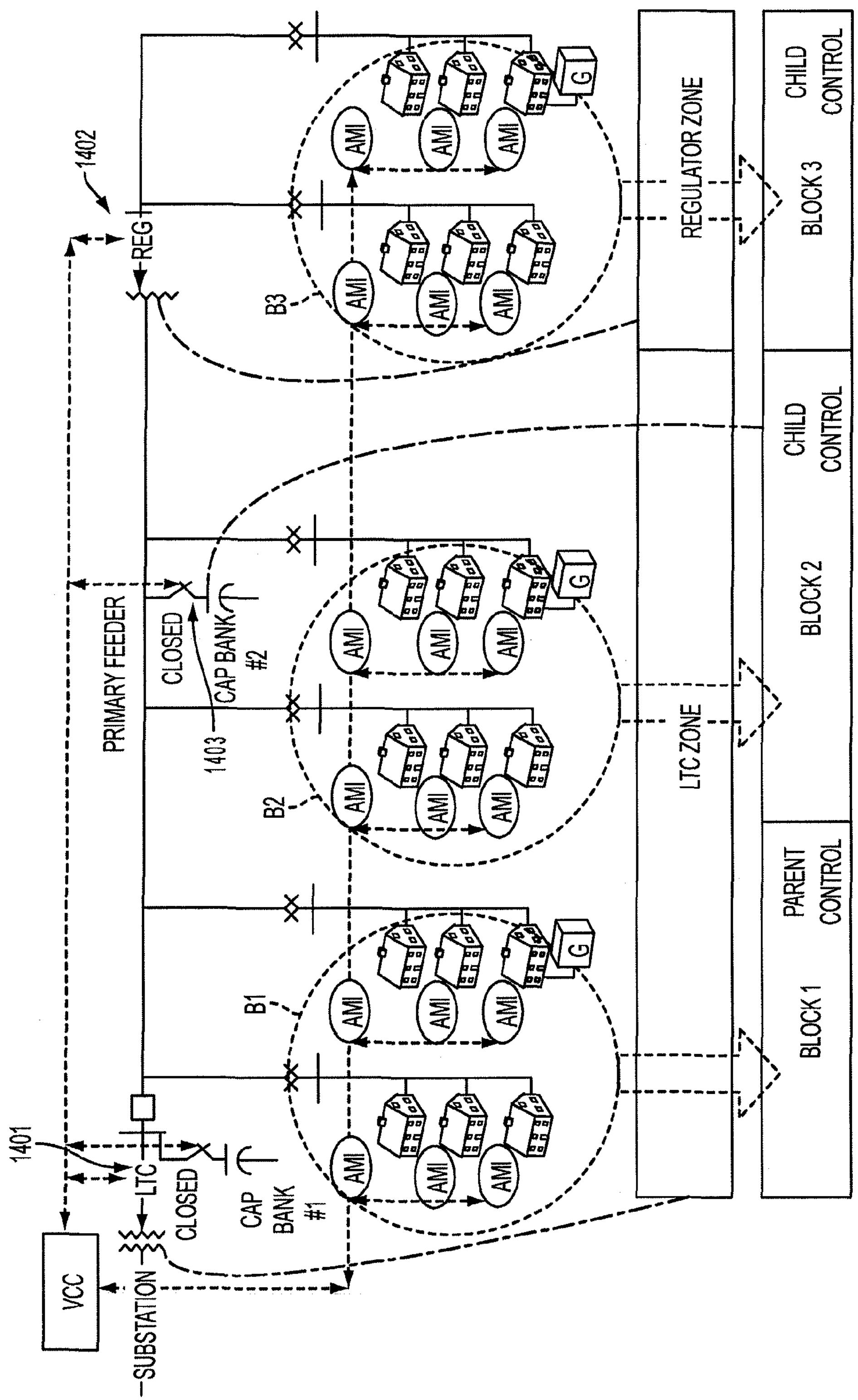
FIG. 7 shows an example of the mapping of control meters to zones of control and blocks of control, according to principles of the disclosure.

FIG. 6 shows an example of the linear regression analysis relating the control variables to the EUS voltages that determine the power loss, voltage level and provide the input for searching for the optimum condition and recognizing the abnormal voltage levels from the AMI voltage metering. The specifics of this linear regression analysis are discussed in more detail in are described in co-pending patent application No. 61/794,623, entitled ELECTRIC POWER SYSTEM CONTROL WITH PLANNING OF ENERGY DEMAND AND ENERGY EFFICIENCY USING AMI-BASED DATA ANALYSIS, filed on Mar. 15, 2013 ("the co-pending/P008 application"), the entirety of which is incorporated herein FIG. 7 shows an example of the mapping of control meters to zones of control and blocks of control. Each "zone" refers to all AMIs 330 downstream of a regulator and upstream of the next regulator (e.g., LTC, regulator) and each "block" refers to areas within the sphere of influence of features of the distribution system (e.g., a specific capacitor). In the example shown in FIG. 7, the LTC Zone includes all AMIs 330 downstream of the LTC and upstream of regulator 1402 (e.g., the AMIs 330 in B1 and B2), the Regulator Zone includes all AMIs 330 downstream of regulator 1402 (e.g., the AMIs 300 in B3), and Block 2 (B2) includes all AMIs 330 within the influence (upstream or downstream) of capacitor 1403. Each block includes a specific set of meters 330 for monitoring. The particular meters 330 that are monitored may be determined by the adaptive process within the VCC 200 (as described in US publication 2013/0030591) with respective AMI meter populations.

Figure 8:
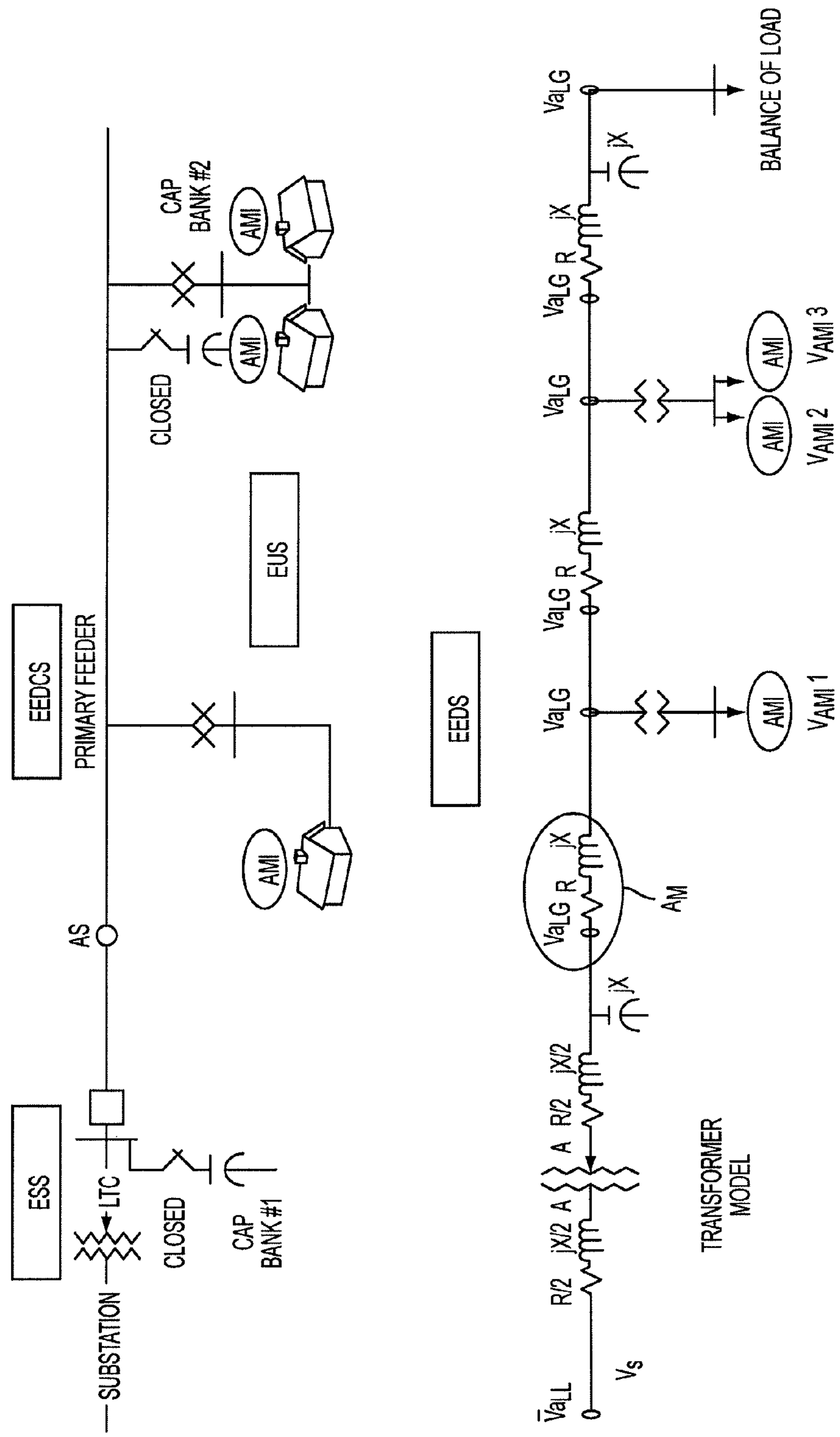
FIG. 8 shows an example of how the voltage characteristics from the independent variables are mapped to the linear regression models of the bellwether meters, according to principles of the disclosure.

FIG. 8 shows an example of how the voltage characteristics from the independent variables are mapped to the linear regression models of the monitored meters 330. The primary loadflow model is used to determine how the general characteristics of the LTC transformer, regulator, capacitor bank, distributed generation and other voltage control independent variables affect the linear regression model. This change is initiated and used to determine the decision point for operating the independent variable so that the optimization process can be implemented to determine the new limiting point from the boundary conditions. The model uses the conversion of the electrical model to a per unit calculation that is then converted to a set of models with nominal voltages of 120 volts. This is then used to translate to the VCC process for implementing the linear regression models for both the ESS to EUS voltage control and the calculation of the EEDS losses. The modeling process is described in further detail with respect to FIG. 6 of the co-pending/P008 application.

Figure 9:
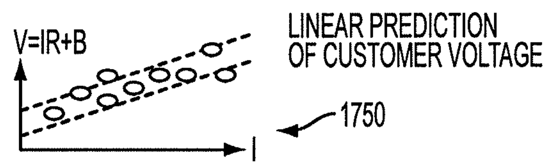
FIG. 9 shows the model used for the implementation of the optimization solution for the VCC, including the linearization for the EEDCS and the linearization of the two loss calculations, according to the principles of the disclosure.

Tables 1-4 and FIG. 9 show the implementation of the optimization control for the VCC 200. Table 1 shows the definition of the boundary conditions for defining the optimization problem and solution process for the VCC 200. Table 1 also describes the boundaries where the model does not apply, for example, the model does not represent the loading of the equipment within the EEDS 700. This modeling is done, instead by more detailed loadflow models for the primary system of the EEDS 700 and is accomplished in the more traditional distribution management systems (DMS) not covered by this disclosure. The present voltage control process is a voltage loss control process that can be plugged into the DMS 480 controls using the VCC 200 process described in FIG. 2.

TABLE 1

| The Voltage Optimization Problem<br>Problem Boundaries: EEDS System |
|---|
| Specifically the boundary is around control of two characteristics<br>Power flow from the ESS to the EUS<br>Power flow from the EUS to the EDS with CVR<br>The control of the secondary or EUS delivery voltages<br>The loading of the equipment is outside of the problem boundaries |

Table 2 shows the performance criterion (e.g., the values to be optimized) and the independent variables (e.g., the values that are varied to gain the optimized solution) of the optimization problem for the VCC 200. The performance criterion are represented by the linear loss models for the EEDCS primary and secondary as well as the CVR factor linear model of the EUS to ED. The use of these linear models in the optimization allows a simple method of calculating the losses within the constraints of the EUS voltages. It also takes advantage of the order of magnitude difference between the two types of losses (as described above with respect to FIG. 3) to make a practical calculation of the performance criterion for the optimization problem.

TABLE 2

| The Voltage Optimization Problem |
|---|
| The Performance Criterion: EEDS System Losses |
| Power flow losses from the ESS to the EUS<br>Power flow from the EUS to the EDS from CVR<br>The losses in the EDS beyond CVR from loading of the equipment is not included<br>The Independent Variables: |
| LTC Control Voltage setpoints<br>Capacitor Bank Voltage and/or Var setpoints<br>Line Regulator Voltage setpoints<br>EUS Voltage Control<br>EDS level Voltage Control |

FIG. 9 shows the summary model used for the implementation of the optimization solution for the VCC including the linearization for the EEDCS and the linearization of the two loss calculations as well as the linearization model 1750 of the control variables to the output EUS voltages in the bellwether group as well as the general EUS voltage population. These models allow a direct solution to the optimization to be made using linear optimization theory.

Table 3 shows the operational constraints of the EUS voltages and the specific assumptions and calculations needed to complete the derivation of the optimization solution that determines the process used by the VCC 200 to implement the optimization search for the optimum point on the boundary conditions determined by the constraints by the EUS voltages. The assumptions are critical to understanding the novel implementation of the VCC control 200 process. The per unit calculation process develops the model basis where the primary and secondary models of the EEDCS 1000 can be derived and translated to a linear process for the determination of the control solution and give the VCC 200 its ability to output voltages at one normalized level for clear comparison of the system state during the optimization solution. The assumption of uniform block loading is critical to derive the constant decreasing nature of the voltage control independent variables and the slope variable from the capacitor bank switching. Putting these assumptions together allows the solution to the optimization problem to be determined. The solution is a routine that searches the boundary conditions of the optimization, specifically the constraint levels for the EUS to ED voltages to locate the boundary solution to the linear optimization per linear optimization theory.

TABLE 3

| The Voltage Optimization Problem |
|---|
| The System Model |
| Subject to constraints:<br>$V_{AMI}$ < +5% of Nominal<br>$V_{AMI}$ < −5% of Nominal<br>The Optimum is at a System Model Boundary |
| The Per Unit Calculation<br>Uniform Load Assumption<br>Calculation of EEDCS Losses and EUS to EDS losses<br>Decreasing Loss with Decreasing Control Variable<br>Decreasing Loss with Decreasing Voltage Slope<br>The Boundary Search Algorithm |

Table 4 shows the general form of the solution to the optimization problem with the assumptions made in Table 3. The results show that the VCC 200 process must search the boundary conditions to find the lowest voltages in each block and used the minimization of the slope of the average block voltages to search the level of independent variables to find the optimal point of voltage operation where the block voltages and block voltage slopes are minimized locating the solution to the optimization problem where the EEDCS 1000 and the EUS 900 to ED 300 losses are minimized satisfying the minimization of the performance criterion by linear optimization theory.

TABLE 4

| Controlling Voltage Optimization |
|---|
| The Optimization Specification |
| Performance Criterion: Minimize Loss EEDCS and CVR factor EUS to EDS<br>The EEDS Model Equations: Linear Voltage Relationships |
| Vs − Vami = A + BIami<br>I is ESS current levels<br>Vs is the ESS source voltages<br>Vami is the EUS to EDS output voltages<br>A and B are linear regression constants<br>Constraints: −5% < Vami < +5% |
| The Boundary Condition solution<br>Voltage Centered in combined regression bands<br>Slope Minimization |

Table 5 is similar to Table 4, with an added practical solution step to the VCC optimization of using the process of boundary searching to output the setpoint change to the independent control variables with a bandwidth that matches the optimization solution, allowing the control to precisely move the EEDS 700 to the optimum point of operation. This also allows the VCC process 200 to have a local failsafe process in case the centralized control loses its connection to the local devices. If this occurs the local setpoint stays on the last setpoint and minimizes the failure affect until the control path can be re-established.

TABLE 5

| Controlling Voltage Optimization |
|---|
| The Optimization Specification |
| Performance Criterion: Minimize Loss EEDCS and CVR factor EUS to EDS<br>The EEDS Model Equations: Linear Voltage Relationships |
| Vs − Vami = A + BIami<br>I is ESS current levels<br>Vs is the ESS source voltages<br>Vami is the EUS to EDS output voltages<br>A and B are linear regression constants<br>Constraints: −5% < Vami < +5% |
| The Boundary Condition solution<br>Voltage Centered in combined regression bands<br>Slope Minimization<br>Setpoint control with bandwidths |

Figure 10:
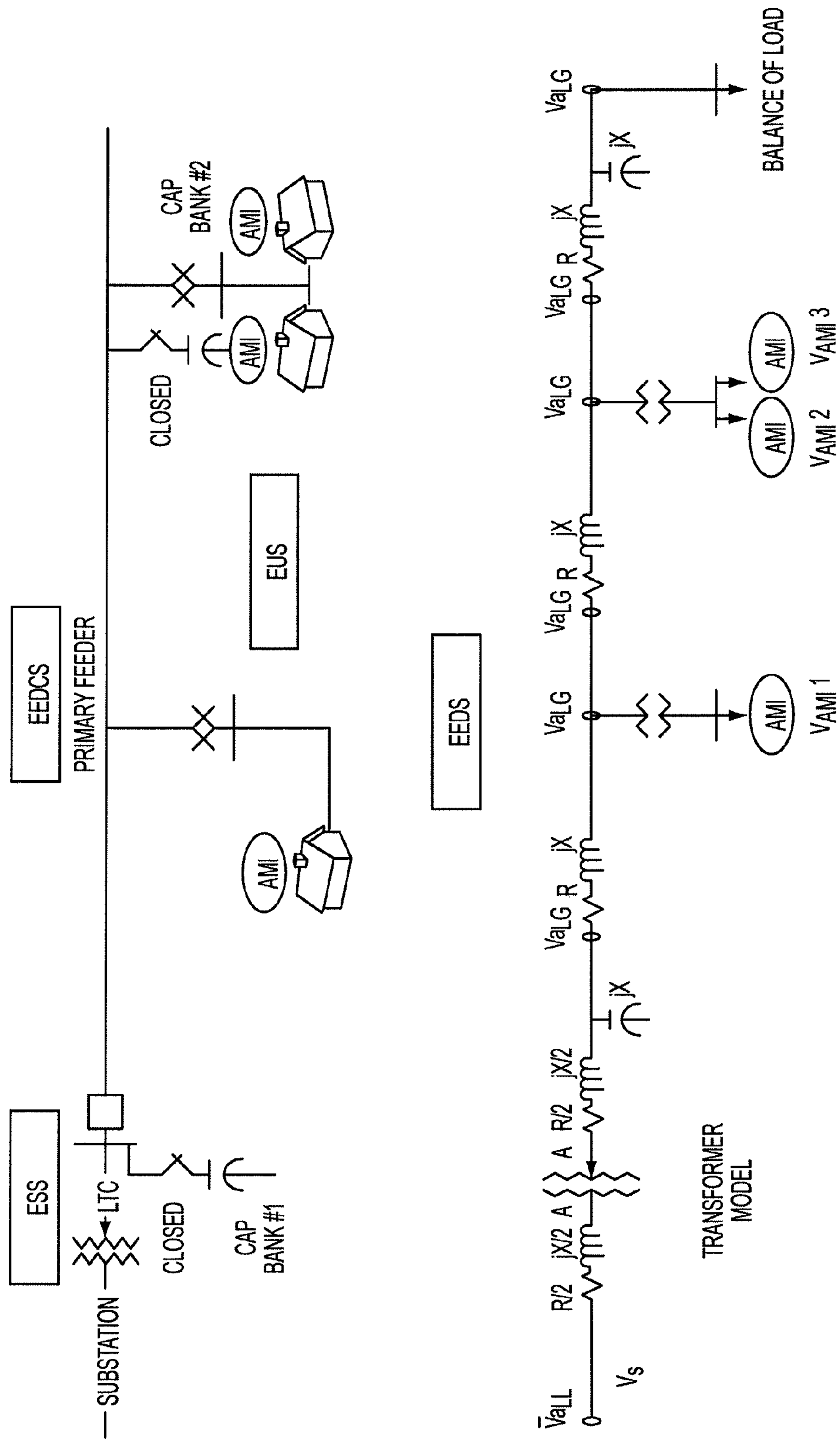
FIG. 10 shows a representation of the approach to applying the per unit calculation to demonstrate the representation of the relative values of the impedances and losses of the EEDCS during VCC operation, according to principles of the disclosure.

FIG. 10, which is similar to FIG. 8, shows a representation of the approach to applying the per unit calculation to demonstrate the representation of the relative values of the impedances and losses of the EEDCS 1000 during VCC 200 operation. This model also shows that the per unit values can be used to build a model at the primary and secondary side that can translate the EEDS 700 and EUS 900 voltages to a common 120 volt base for comparison. This method is the method that the VCC 200 uses to display information on voltage to the operators using a familiar looking interface (e.g., the interface is made to look similar to what the operator is accommodated to seeing with the older standard LTC transformer and regulator in a DMS frame of reference, see e.g., FIG. 11). This has a practical benefit of making the transition to using the VCC 200 an easy transition for the operators because it reacts in a very intuitive way similar to the older type of controls.

Figure 11:
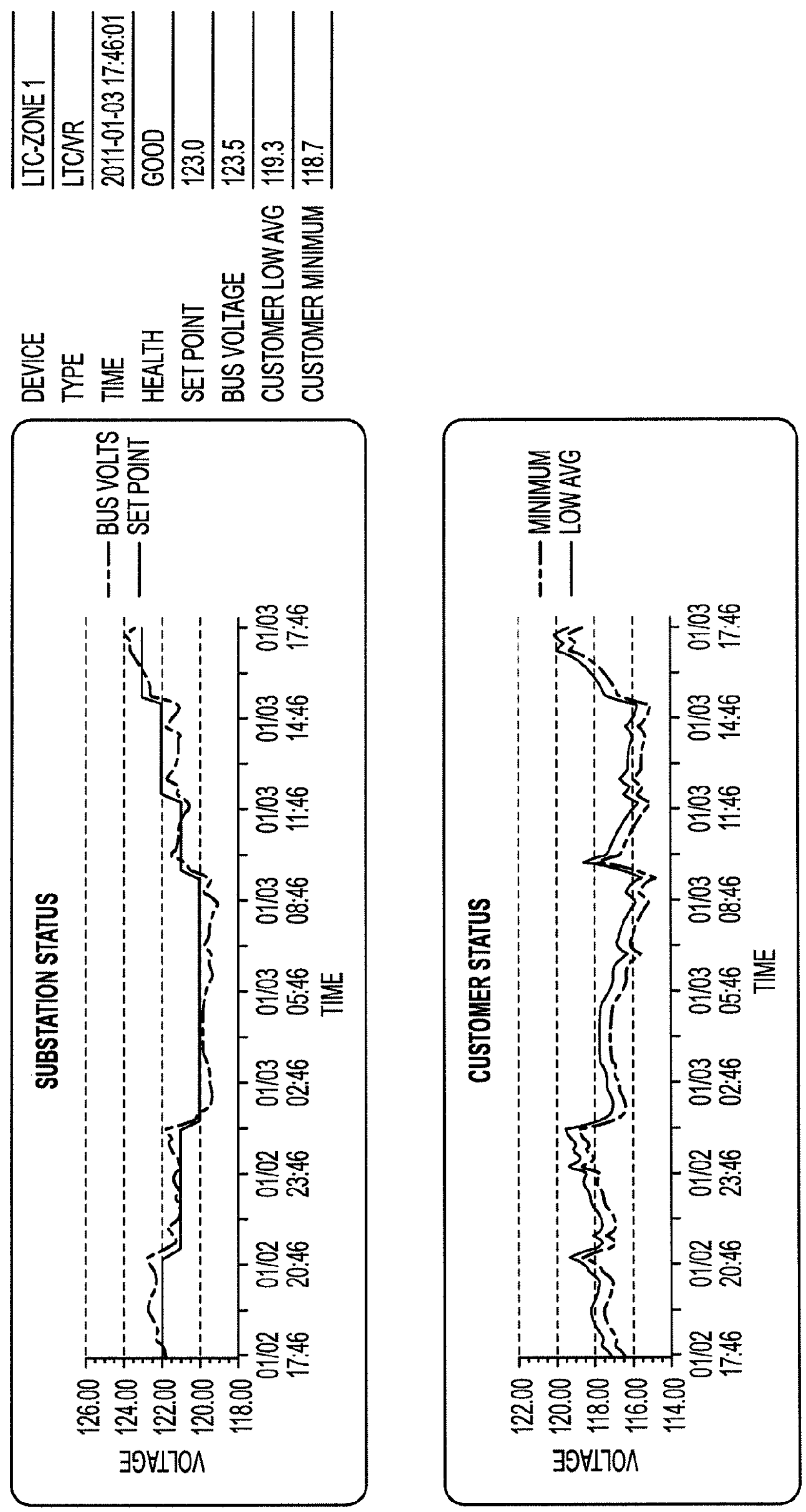
FIG. 11 shows the way the VCC displays the ESS voltage data and the EUS monitored meter data for display to the operators.

FIG. 11 shows the way the VCC 200 displays the ESS voltage data and the EUS monitored meter data on the common 120 nominal voltage levels for display to the operators. The average value of the lowest meters tracking the block lowest voltages is displayed in the lower graph. This is the block method of searching for the optimum condition by tracking the low voltage boundary conditions directly at the block voltage limits. Between the two graphs it is simple and intuitive to determine the expected operation of the VCC 200.

Figure 12:
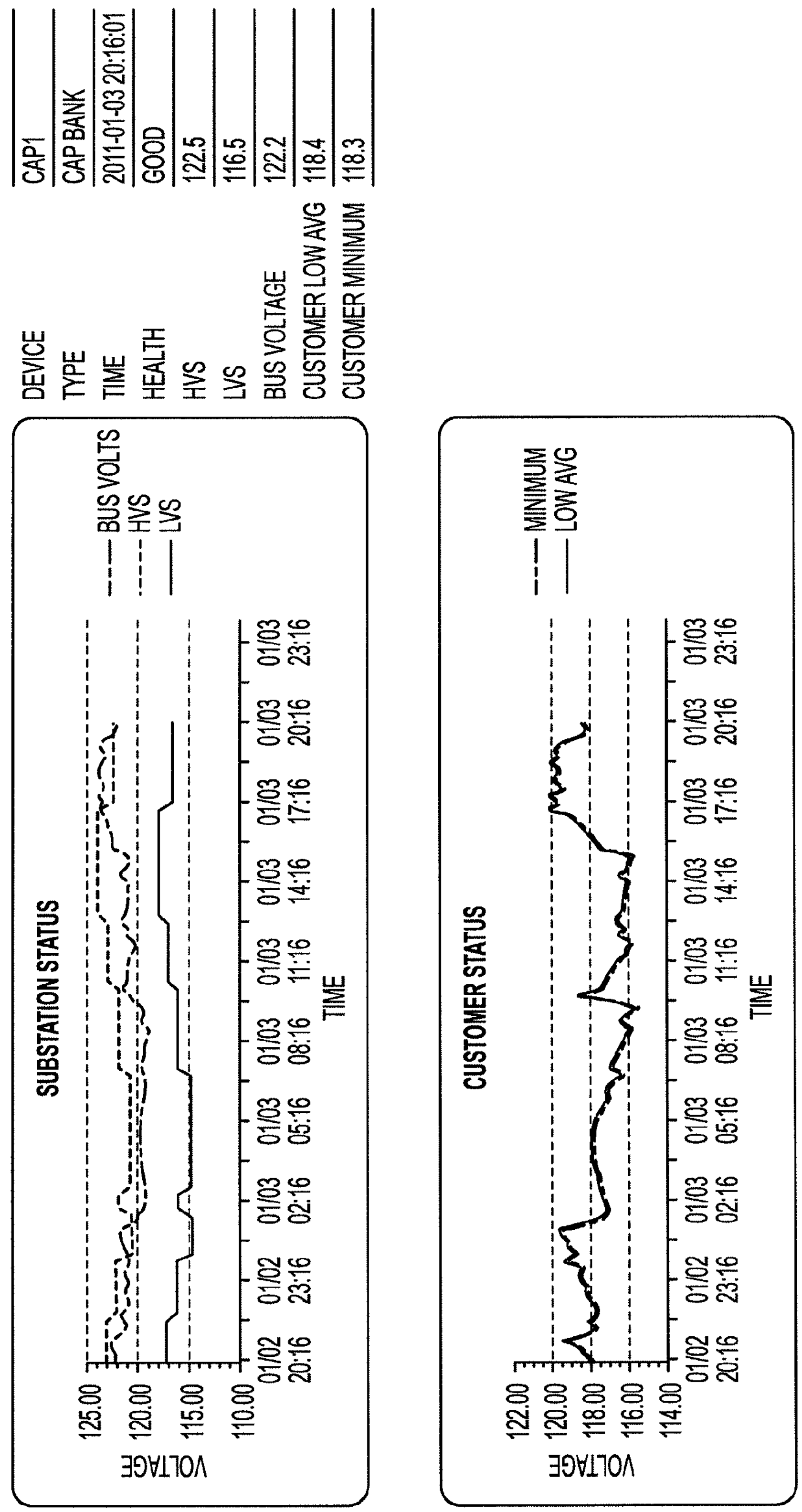
FIG. 12 is similar to FIG. 16, except that it is a display for the capacitor bank child control showing its bandwidth limits and the operating voltage in the top graph and the monitored group of meters in the lower group that also searches the boundary and the slope from the LTC transformer monitored to the capacitor bank monitored is used to determine the optimum point in the loading to switch the capacitor bank in to minimize the slope of the line connecting the two monitored groups.

FIG. 12 is the same diagram as FIG. 11 except that it is for the capacitor bank child control showing its bandwidth limits and the operating voltage in the top graph and the monitored group of meters in the lower graph, that also searches the boundary and the slope from the LTC transformer monitored meter to the capacitor bank monitored meter is used to determine the optimum point in the loading at which to switch in the capacitor bank in order to minimize the slope of the line connecting the two monitored groups. This display makes it easy for the operator to see intuitively how the system is controlling the capacitor to implement the optimization for the EEDS 700.

Figure 13:
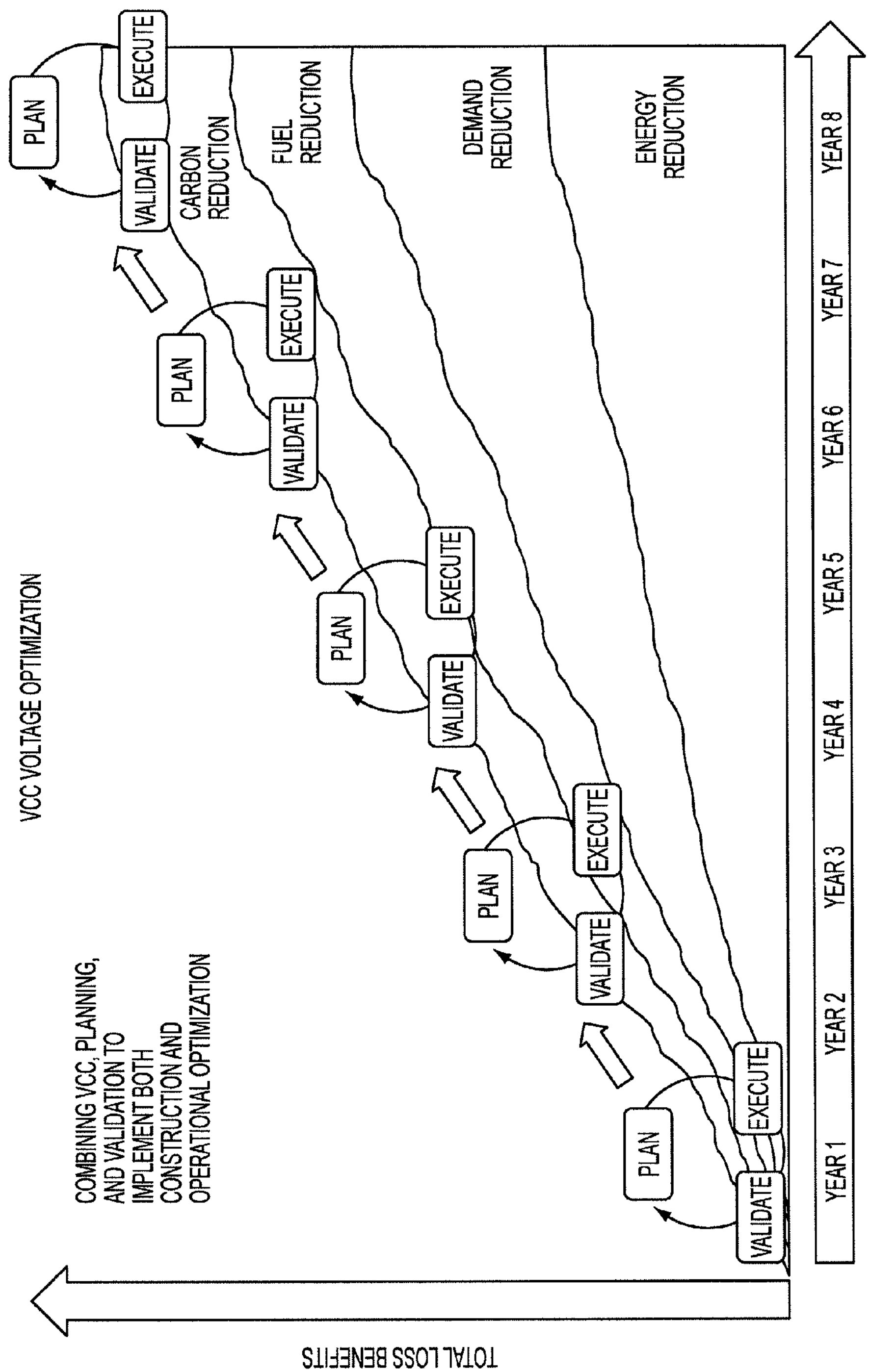
FIG. 13 is a chart of the overall VCC, EVP, and EPP processes, showing optimization of the VCC process as well as optimization of the EEDS EPP process and improvement of the VCC process that minimizes real time losses in the EEDS and ED.

FIG. 13 is the final chart of the overall VCC 200, EVP 600, and EPP 1700 processes used together that not only optimizes the VCC process but also optimizes the EEDS EPP process by selecting the best improvements to be made to improve the reliability of the EEDS voltage control and also improves the VCC process that minimizes real-time losses in the EEDS and ED. This continuous improvement process for the EEDS 700 optimizes the EEDS both continuously in near time intervals as well as over longer periods of time allowing the optimization of the EEDS over planning review cycles to focus on system modifications that allow overall improvements in the EEDS optimization level by extending the ability to operate on more efficient boundary conditions.

What is claimed as new and desired to be protected by Letters Patent of the United States is:

1. A control system for an electric power transmission and distribution grid configured to supply electric power from a supply point to a plurality of user locations, the system comprising:

a plurality of sensors, wherein each sensor is located at a respective one of a plurality of distribution locations on the distribution grid at or between the supply point and at least one of the plurality of user locations, and wherein each sensor is configured to sense a component of the supplied electric power at the respective distribution location and to generate measurement data based on the sensed component of the power;

a controller configured to generate an energy delivery parameter based on a comparison of the measurement data received from the sensors to a controller target band; and, a component adjusting device configured to adjust a component of the electric power transmission and distribution grid in response to the energy delivery parameter;

wherein the controller target band has upper and lower limits, the upper and lower limits defining a range of acceptable values for the component of electric power at the distribution locations, wherein the controller is configured to derive a linear model for at least one power loss from an upstream location to a downstream location and optimize through linear optimization a control point for the component adjusting device.

2. The system of claim 1, wherein the component of the supplied electric power is voltage and the controller target band is a controller target voltage band, the component adjusting device includes at least one independent variable voltage control device, and the controller is configured to minimize the at least one power loss through linear optimization.

3. The system of claim 2, wherein the controller target band upper and lower limits define a lower portion of a range of acceptable voltage at distribution locations.

4. The system of claim 2, wherein the controller is further configured to receive measurement data from each sensor of a subset of the plurality of sensors, and to generate the energy delivery parameter based on a comparison of the measurement data received from the subset to a controller target voltage band.

5. The system of claim 4, wherein the subset of sensors are within a specific block of the electric power grid.

6. The system of claim 1, wherein the voltage measurement data from a plurality of portions of the grid is displayed to an operator of the system based on a per unit value.

7. The system as in claim 6, wherein the data from the supply point and the distribution points are displayed based on a per unit value referenced to 120 volts.

8. The system of claim 1, wherein the controller is adapted to compare measurement data received from the sensors to the linear model and to previously fingerprinted deviations to determine an abnormal voltage operation indication for alarming and control.

9. The system of claim 1, wherein optimize through linear optimization a control point for the component adjusting device includes the controller being configured to derive at least two boundary conditions and to simultaneously solve the boundary search using minimum voltages for at least one distribution location point and a minimum voltage slope for a respective component adjusting device location.

10. The system of claim 1, wherein the component adjusting device is configured to adjust a component of the electric power transmission and distribution grid in response to the energy delivery parameter based on energy demand and energy efficiency savings.

11. A control system for an electric power transmission and distribution grid configured to supply electric power from a supply point to a plurality of user locations, the system comprising:

a plurality of sensors, wherein each sensor is located at a respective one of a plurality of distribution locations on the electric power grid at or between the supply point and at least one of the plurality of user locations, and wherein each sensor is configured to sense a component of the supplied electric power at the respective distribution location and to generate measurement data based on the sensed component of the power;

a controller configured to generate an energy delivery parameter based on a comparison of the measurement data received from each sensor of a subset of the plurality of sensors to a controller target band and the subset of sensors are within a specific block of the distribution grid a component adjusting device configured to adjust a component of the electric power transmission and distribution grid in response to the energy delivery parameter;

wherein the controller target band has upper and lower limits, the upper and lower limits defining a range of acceptable values for the component of electric power at the distribution locations wherein the controller is configured to derive a linear model for at least one power loss from an upstream location to a downstream location.

12. The system of claim 11, wherein the voltage component of electric power includes both voltage magnitude and voltage angle, and there are a plurality of said subsets, each subset corresponding to a respective block of the distribution grid, and the controller is further adapted to determine for each subset the slope of the average voltage of the subset as a function of the electric current at the supply point and as a function of the at least one independent variable voltage control device, and to control the voltage control device based on the average voltage and the slopes.

13. The system of claim 12, wherein the voltage controller is further adapted to control the at least one independent variable voltage control device to minimize the average voltage and the slopes.

14. The system of claim 13, wherein each of the subsets corresponds to a respective zone of the distribution grid and each of the at least one independent variable voltage control device corresponds to a respective block or zone of the distribution grid.

15. A method for controlling electric power supplied to a plurality of distribution locations located at or between a supply point and at least one user location, each of the plurality of distribution locations including at least one sensor configured to sense a component of the supplied electric power at the respective distribution location and generate measurement data based on the sensed component, the method comprising:

generating an energy delivery parameter based on a comparison of the measurement data received from the sensors to a controller target band, the controller target band having upper and lower limits, the upper and lower limits defining a range of acceptable value of the sensed component at distribution locations;

operating a component adjusting device configured to adjust a component of the electric power transmission and distribution grid in response to the energy delivery parameter;

deriving a linear model for at least one power loss from an upstream location to a downstream location; and optimizing through linear optimization a control point for the component adjusting device.

16. The method of claim 15, wherein the component of the supplied electric power is voltage and the controller target band is a controller target voltage band.

17. The method of claim 16, wherein the voltage component of the supplied electric power includes the voltage magnitude and the voltage angle.

18. The method of claim 16, wherein optimizing includes determining an optimum level in real time using the voltage measurement, and the component adjusting device includes at least one independent variable voltage control device.

19. The method of claim 18, wherein optimizing through linear optimization includes minimizing the at least one power loss through linear optimization.

20. The method of claim 18, wherein the controller receives measurement data from each sensor of a subset of the plurality of sensors, and generates the energy delivery parameter based on a comparison of the measurement data received from the subset to a controller target voltage band.

21. The method of claim 20, wherein the subset is of sensors are within a specific block of the electric power grid.

22. The method of claim 15, wherein each of the subsets corresponds to a respective zone of the distribution grid, and each of the at least one independent variable voltage control device corresponds to a respective block or zone of the distribution grid.

23. The method of claim 15, wherein the voltage measurement data from a plurality of portions of the grid is displayed to an operator of the system based on a per unit value.

24. The method as in claim 23, wherein the data from the supply point and the distribution points are displayed based on a per unit value referenced to 120 volts.

25. The method of claim 15, further comprising measurement data received from the sensors to the linear model and to previously fingerprinted deviations to determine an abnormal voltage operation indication for alarming and control.

26. The method of claim 15, wherein optimizing includes deriving at least two boundary conditions and to simultaneously solve the boundary search using minimum voltages for at least one distribution location point and a minimum voltage slope for a respective component adjusting device location.

27. The method of claim 15, wherein the component adjusting device is operated to adjust a component of the electric power transmission and distribution grid in response to the energy delivery parameter based on energy demand and energy efficiency savings.

28. A method for controlling electric power supplied to a plurality of distribution locations located at or between a supply point and at least one user location, each of the plurality of distribution locations including at least one sensor configured to sense a component of the supplied electric power at the respective distribution location and generate measurement data based on the sensed component, the method comprising:

generating an energy delivery parameter based on a comparison of the measurement data received from each sensor of a subset of the plurality of sensors to a controller target band, the controller target band having upper and lower limits, the upper and lower limits defining a range of acceptable value of the sensed component at distribution locations, and the subset of sensors are within a specific block of the distribution grid;

operating a component adjusting device configured to adjust a component of the electric power transmission and distribution grid in response to the energy delivery parameter;

deriving a linear model for at least one power loss from an upstream location to a downstream location.

29. The method of claim 28, wherein the voltage component of electric power includes both voltage magnitude and voltage angle, and there are a plurality of said subsets, each subset corresponding to a respective block of the distribution grid, and the method further includes determining for each subset the slope of the average voltage of the subset as a function of the electric current at the supply point and as a function of the at least one independent variable voltage control device, and controlling the voltage control device based on the average voltage and the slopes.

30. The method of claim 29, wherein the voltage controller further controls the at least one independent voltage control device to minimize the average voltage and the slopes.

31. A controller for an electric power grid configured to supply electric power from a supply point to a plurality of consumption locations, the controller comprising:

a sensor receiving code section configured to receive measurement data from a plurality of sensors, wherein each sensor is located at a respective one of a plurality of distribution locations on the electric power grid at or between the supply point and at least one of the plurality of consumption locations, and wherein each sensor is configured to sense at least one component of the supplied electric power received at the respective distribution location and at least one of the plurality of sensors is configured to generate measurement data based on the sensed component, a linear model code section for deriving a linear model for at least one power loss for a portion of the electric power grid between the supply point and the consumption location;

an adjusting code section configured to cause the adjustment of a component of the electric power supplied at the supply point based on the measurement data received from the sensors.

32. The controller of claim 31, wherein the controller further comprises an optimization code section configured to optimize through linear optimization a control point for the adjustment of a component of the electric power supplied at the supply point.

33. The controller of claim 32, wherein the optimization code section is further configured to minimize the at least one power loss through linear optimization.

* * * * *